US012432174B2

(12) United States Patent
Ge et al.

(10) Patent No.: US 12,432,174 B2
(45) Date of Patent: Sep. 30, 2025

(54) INFORMATION OBTAINING METHOD AND APPARATUS

(71) Applicant: HUAWEI TECHNOLOGIES CO., LTD., Guangdong (CN)

(72) Inventors: Cuili Ge, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 691 days.

(21) Appl. No.: 17/675,705

(22) Filed: Feb. 18, 2022

(65) Prior Publication Data

US 2022/0174585 A1 Jun. 2, 2022

Related U.S. Application Data

(63) Continuation of application No. PCT/CN2020/080966, filed on Mar. 24, 2020.

(51) Int. Cl.
| | |
|---|---|
| *H04L 61/4541* | (2022.01) |
| *H04L 67/1021* | (2022.01) |
| *H04W 4/40* | (2018.01) |
| *H04W 48/04* | (2009.01) |
| *H04W 48/16* | (2009.01) |

(52) U.S. Cl.
CPC ...... *H04L 61/4541* (2022.05); *H04L 67/1021* (2013.01); *H04W 4/40* (2018.02); *H04W 48/04* (2013.01); *H04W 48/16* (2013.01)

(58) Field of Classification Search
CPC ..... H04L 67/303; H04L 67/141; H04L 67/01; H04L 67/34; H04W 4/50; H04W 64/00; H04W 28/08; G06F 40/106
See application file for complete search history.

(56) References Cited

U.S. PATENT DOCUMENTS

| | | | |
|---|---|---|---|
| 2010/0131835 A1 | 5/2010 | Kumar et al. | |
| 2013/0124595 A1 | 5/2013 | Oplinger et al. | |
| 2014/0108674 A1 | 4/2014 | Eggleston et al. | |
| 2018/0041424 A1 | 2/2018 | Zhang | |
| 2018/0263039 A1 | 9/2018 | Fang et al. | |
| 2019/0092578 A1* | 3/2019 | Umeyama | B60L 13/03 |
| 2019/0141606 A1 | 5/2019 | Qiao et al. | |

(Continued)

FOREIGN PATENT DOCUMENTS

| | | |
|---|---|---|
| CN | 101159750 A | 4/2008 |
| CN | 106488504 A | 3/2017 |

(Continued)

OTHER PUBLICATIONS

China Mobile, "New WID on Study on support of the 5GMSG Service," 3GPP TSG-SA WG6 Meeting #31, S6-190893, Bruges, Belgium, May 20-24, 2019, 3 pages.

(Continued)

*Primary Examiner* — Iqbal Zaidi

(74) *Attorney, Agent, or Firm* — Fish & Richardson P.C.

(57) ABSTRACT

Example information obtaining methods and apparatus are described. One example method includes receiving information about a first instance of an application and information about a second instance of the application by a first server from a second server and a third server respectively. The first server stores the information about the first instance and the information about the second instance.

21 Claims, 16 Drawing Sheets

(56) References Cited

U.S. PATENT DOCUMENTS

2020/0242251 A1* 7/2020 Wisgo .................... G06F 21/564
2021/0157938 A1* 5/2021 Chen ........................ H04L 9/088

FOREIGN PATENT DOCUMENTS

| | | | |
|---|---|---|---|
| CN | 107566437 A | 1/2018 | |
| CN | 109040312 A | 12/2018 | |
| CN | 109218455 A | 1/2019 | |
| CN | 109257193 A | 1/2019 | |
| CN | 109788078 A | 5/2019 | |
| CN | 109831548 A | 5/2019 | |
| CN | 109862581 A | 6/2019 | |
| CN | 109952741 A | 6/2019 | |
| CN | 109981316 A | 7/2019 | |
| CN | 110098947 A | 8/2019 | |
| CN | 110120879 A | 8/2019 | |
| CN | 110730499 A | 1/2020 | |
| EP | 3703337 A1 | 9/2020 | |
| WO | 2017100640 A1 | 6/2017 | |
| WO | 2019001174 A1 | 1/2019 | |
| WO | 2019100266 A1 | 5/2019 | |
| WO | 2019104280 A1 | 5/2019 | |
| WO | 2019137207 A1 | 7/2019 | |

OTHER PUBLICATIONS

PCT International Search Report and Written Opinion issued in International Application No. PCT/CN2019/101650 on Apr. 29, 2020, 17 pages (with English translation).

PCT International Search Report and Written Opinion issued in International Application No. PCT/CN2020/080966 on May 29, 2020, 17 pages (with English translation).

Samsung Electronics, "Pseudo-CR on Key Issue—Edge service enablement on the Edge Network," 3GPP TSG-SA WG6 Meeting #30, S6-190625, Newport Beach, USA, Apr. 8-12, 2019, 2 pages.

Office Action issued in Chinese Application No. 202080054615.6 on Jul. 7, 2022, 10 pages.

3GPP TR 23.758, V0.3.0 (Jul. 2019), "3rd Generation Partnership Project; Technical Specification Group Services and System Aspects; Study on Application Architecture for Enabling Edge Applications; (Release 17)," Jul. 2019, 42 pages.

Alibaba Group, "Pseudo-CR on New Solution—Service Continuity for Edge Computing Service," 3GPP TSG-SA WG6 Meeting #32, S6-191327, Roma, Italy, Jul. 8-12, 2019, 3 pages.

Extended European Search Report issued in European Application No. 20854354.6 on Sep. 12, 2022, 11 pages.

3GPP TS 23.501 V16.1.0, "3rd Generation Partnership Project; Technical Specification Group Services and System Aspects; System Architecture for the 5G System; Stage 2 (Release 16)," Jun. 2019, 367 pages.

3GPP TS 23.503 V16.1.0, "3rd Generation Partnership Project; Technical Specification Group Services and System Aspects; Policy and Charging Control Framework for the 5G System; Stage 2 (Release 16)," Jun. 2019, 98 pages.

Office Action issued in Chinese Application No. 202080058580.3 on Nov. 1, 2022, 10 pages.

* cited by examiner

INFORMATION OBTAINING METHOD AND APPARATUS

CROSS-REFERENCE TO RELATED APPLICATIONS

This application is a continuation of International Patent Application No. PCT/CN2020/080966, filed on Mar. 24, 2020, which claims priority to International Patent Application No. PCT/CN2019/101650, filed on Aug. 20, 2019. The disclosures of the aforementioned applications are hereby incorporated by reference in their entireties.

TECHNICAL FIELD

Embodiments of this application relate to the communication field, and in particular, to an information obtaining method and apparatus.

BACKGROUND

With rapid development of a mobile internet and an internet of things, to resolve problems, for example, a limited computing capability, a limited storage capability, and energy consumption, of a terminal device, a computing task with high complexity and high energy consumption needs to be migrated to a server of a cloud computing data center, to reduce the energy consumption of the terminal device, and prolong standby duration of the terminal device. However, a manner in which the computing task is migrated to the server of the cloud computing data center not only causes transmission of a large amount of data and therefore increases network load, but also causes a data transmission delay and therefore affects a delay-sensitive service. Therefore, a concept of multi-access edge computing (multi-access edge computing, MEC) is proposed to effectively resolve a problem of the high network load caused by the rapid development of the mobile internet and the internet of things and satisfy requirements such as high bandwidth and a low delay. In the multi-access edge computing technology, a generic server may be deployed on a radio access side, to provide an information technology (information technology, IT) capability and a cloud computing capability for a radio access network.

In a system architecture of the multi-access edge computing technology, one application may correspond to one or more instances. When the application corresponds to the plurality of instances, each of the plurality of instances is managed by one edge enabler server. When another device needs to obtain information about the plurality of instances of the application, the information needs to be obtained by separately querying a plurality of edge enabler servers that manage the plurality of instances. Consequently, a large quantity of signaling overheads and a service delay are caused, and therefore user experience is affected.

SUMMARY

Embodiments of this application provide an information obtaining method, used to obtain and store information about application instances, so that a user can directly obtain the information about the application instances from a first server, and does not need to obtain the information about the application instances by querying a second server and a third server. Signaling overheads can be reduced, and a service delay can be reduced.

According to a first aspect, an embodiment of this application provides an information obtaining method. The method is implemented by a first server, a second server, and a third server. The first server is a server serving the second server and the third server. The first server may receive information about a first instance of an application from the second server, and the first server may receive information about a second instance of the application from the third server. The information about the first instance includes identification information of the application and first information, and the first information is used to indicate a location of the first instance. The information about the second instance includes the identification information of the application and second information, and the second information is used to indicate a location of the second instance. Then, the first server stores the information about the first instance and the information about the second instance. Therefore, a problem of storing the information about the first instance of the application and the information about the second instance of the application is resolved.

In this embodiment of this application, the first server that manages information about application instances may respectively receive the information about the first instance of the application and the information about the second instance of the application from the second server and the third server, and store the information about the first instance of the application and the information about the second instance of the application in the first server. Therefore, a problem of storing the information about the application instances in edge networks is resolved, so that the first server sends the information about the application instances to another device (for example, a first device). When the another device needs to obtain the information about the application instances, the another device may directly obtain the information about the application instances from the first server, and does not need to obtain the information about the application instances by querying the second server and the third server. Signaling overheads can be reduced, and a service delay can be reduced.

According to the first aspect, in an implementation of the first aspect of the embodiments of this application, the first server receives area information of the second server from the second server or a first network element; the first server obtains location information of user equipment, and the first server determines a target server based on the area information of the second server and the location information of the user equipment.

According to the first aspect, in another implementation of the first aspect of the embodiments of this application, the first network element is an NEF network element, a UDM network element, a UDR network element, a PCF network element, or an NRF network element.

According to the first aspect, in another implementation of the first aspect of the embodiments of this application, the first server receives an application identity from an EEC, where the target server serves an application instance corresponding to the application identity.

According to the first aspect, in a first implementation of the first aspect of the embodiments of this application, the first information includes an internet protocol IP address of the first instance and one or more of the following: access identification information of a first edge network, an IP address of the first edge network, or an IP address of a first edge enabler server, where the second server is located in the first edge network; and the second information includes an IP address of the second instance and one or more of the following: access identification information of a second edge network, an IP address of the second edge network, or an IP address of a second edge enabler server, where the third server is located in the second edge network.

In this implementation, the first information in the information about the first instance and the second information in the information about the second instance are further limited. The first information is used as an example. The first information further includes one or more of the access identification information of the first edge network, the IP address of the first edge network, or the IP address of the first edge enabler server in addition to the internet protocol IP address of the first instance. Therefore, a specific location of the first instance of the application may be determined by using information such as a plurality of pieces of identification information or IP addresses, so that the first server can also accurately determine the specific location of the first instance of the application when obtaining the information about the first instance of the application. Similarly, the first server can also accurately determine a specific location of the second instance of the application when obtaining the information about the second instance of the application.

According to the first aspect or the first implementation of the first aspect, in a second implementation of the first aspect of the embodiments of this application, the method further includes: sending, by the first server, a first application programming interface API discovery request to the second server, where the first API discovery request includes discovery type information, the discovery type information is used to indicate that the first API discovery request is used to request application instances, or the discovery type information is used to indicate that the first API discovery request is used to request application instances and an API, and the application instances include the first instance and the second instance; and sending, by the first server, the first API discovery request to the third server.

In this implementation, it is proposed that a discovery mechanism in a common API framework CAPIF may be reused for signaling exchange between the first server and the second server (or the third server). Specifically, the first server may send the first API discovery request to the second server and the third server, to trigger the second server to send the information about the first instance of the application to the first server and trigger the third server to send the information about the second instance of the application to the first server. Therefore, the first server does not need to separately configure a request for obtaining the information about the application instances. This can reduce signaling overheads between the first server and the second server and between the first server and the third server, and further can reduce an application access delay caused by increasing signaling.

According to the second implementation of the first aspect, in a third implementation of the first aspect of the embodiments of this application, that the first server receives the information about the first instance of the application from the second server includes: receiving, by the first server, a first API discovery response from the second server, where the first API discovery response includes the information about the first instance; and that the first server receives the information about the second instance of the application from the third server includes: receiving, by the first server, a second API discovery response from the third server, where the second API discovery response includes the information about the second instance.

In this implementation, it is proposed that the discovery mechanism in the common API framework CAPIF is reused for signaling exchange between the first server and the second server, and it is also proposed that the information about the first instance sent by the second server to the first server is carried in the first API discovery response, and similarly, the information about the second instance sent by the third server to the first server is carried the second API discovery response. Therefore, the first server may separately receive the information about the application instances from the second server and the third server by using existing signaling, and the second server or the third server does not need to separately configure a message for sending the information about the application instance. Therefore, signaling overheads can be reduced, and further an application access delay caused by increasing signaling can be reduced.

According to the first aspect, in a fourth implementation of the first aspect of the embodiments of this application, that the first server receives the information about the first instance of the application from the second server includes: receiving, by the first server, a first API publish request from the second server, where the first API publish request includes the information about the first instance of the application, and the first API publish request is used to publish an API and/or the first instance; and that the first server receives the information about the second instance of the application from the third server includes: receiving, by the first server, a second API publish request from the third server, where the second API publish request includes the information about the second instance of the application, and the second API publish request is used to publish an API and/or the second instance.

In this implementation, it is proposed that a publish mechanism in a common API framework CAPIF may be reused for signaling exchange between the first server and the second server, and it is also proposed that the information about the first instance sent by the second server to the first server is carried in the first API publish request, and similarly, the information about the second instance sent by the third server to the first server is carried the second API publish request. Therefore, the first server may separately receive the information about the application instances from the second server and the third server by using existing signaling, and the second server or the third server does not need to separately configure a message for sending the information about the application instance. Therefore, signaling overheads can be reduced, and further an application access delay caused by increasing signaling can be reduced.

According to the fourth implementation of the first aspect, in a fifth implementation of the first aspect of the embodiments of this application, the first API publish request further includes publish type information, the publish type information is used to indicate to publish an application instance and/or publish the API, and the application instance includes the first instance. The second API publish request further includes publish type information, the publish type information is used to indicate to publish an application instance and/or publish the API, and the application instance includes the second instance.

In this implementation, it is proposed that each of the first API publish request and the second publish request further includes the publish type information, and the publish type information is used to indicate a type of published content. Therefore, the first server may determine, based on the publish type information, whether the information carried in the first API publish request or the second API publish request includes the information about the application instance.

According to the first aspect or the first implementation of the first aspect, in a sixth implementation of the first aspect of the embodiments of this application, before the first server receives the information about the first instance of the application from the second server, or before the first server receives the information about the second instance of the application from the third server, the method further includes: sending, by the first server, subscription requests to the second server and the third server, where the subscription requests are used to request to subscribe to the information about the application instances.

In this implementation, it is proposed that signaling exchange between the first server and the second server may be based on a subscribe-notification mechanism, that is, the first server subscribes to the information about the application instance from the second server or the third server. In this case, when the information about the application instance in the second server or the third server is updated, the second server or the third server sends the information about the application instance to the first server. Therefore, the first server only needs to send a message to the second server or the third server once, to receive the information about the application instance from the second server or the third server. Therefore, the signaling overheads can be reduced, and further an application access delay caused by increasing signaling can be reduced.

According to the sixth implementation of the first aspect, in a seventh implementation of the first aspect of the embodiments of this application, the subscription requests include subscription conditions, the subscription conditions are used to indicate the application instances, and the application instances include the first instance and the second instance.

In this implementation, the subscription conditions may be carried in the subscription requests, to indicate that content to which the first server requests to subscribe is the information about the application instances or indicate types of the application instances to which the first server requests to subscribe.

According to any one of the first aspect or the first implementation of the first aspect to the seventh implementation of the first aspect, in an eighth implementation of the first aspect of the embodiments of this application, the information about the first instance of the application further includes one or more of the following: identification information of the first edge enabler server or service range information of the first instance; and the information about the second instance of the application further includes one or more of the following: identification information of the second edge enabler server or service range information of the second instance.

In this implementation, it is proposed that the information about the application instance may further include identification information of an edge enabler server or service range information of the application instance. The identification information of the edge enabler server is used to identify an identity of the edge enabler server, so that another server or the first device can accurately search for the edge enabler server. The service range information of the application instance is used to indicate a range of a user that uses the application instance, or may refer to a possible location of a user served by the application instance. Therefore, in this implementation, a specific implementation of the information about the application instance is extended, so that the information about the application instance is applicable to a requirement of a specific scenario.

According to any one of the first aspect or the first implementation of the first aspect to the eighth implementation of the first aspect, in a ninth implementation of the first aspect of the embodiments of this application, the first server is an edge network configuration server.

In this implementation, a specific implementation of the first server in an edge network is specified, and the first server may be the edge network configuration server in the edge network.

According to any one of the first aspect or the first implementation of the first aspect to the ninth implementation of the first aspect, in a tenth implementation of the first aspect of the embodiments of this application, the second server or the third server is any one of the following: an edge enabler server, a network management server in an edge network, an application instance server, or an operation support system OSS network element.

In this implementation, specific implementations of the second server and the third server are specified. The second server and the third server may be a same server in the foregoing plurality of types of servers, or may be different servers in the foregoing plurality of types of servers. Because the second server and the third server may have a plurality of implementations, solution diversity is increased.

According to any one of the first aspect or the first implementation of the first aspect to the tenth implementation of the first aspect, in an eleventh implementation of the first aspect of the embodiments of this application, the method further includes: receiving, by the first server, the identification information of the application and location information of a first device from the first device; and sending, by the first server, an IP address of a third instance to the first device, where the third instance is determined based on the identification information of the application, the location information of the first device, the information about the first instance of the application, and the information about the second instance of the application, and the third instance is the first instance or the second instance.

In this implementation, it is proposed that the first server may determine the third instance in the first instance and the second instance, based on the identification information of the application and the location information of the first device that are sent by the first device. The third instance is determined based on the identification information of the application, the location information of the first device, the information about the first instance of the application, and the information about the second instance of the application. In such an implementation, when the first device needs to obtain an application instance, the first device does not need to sequentially search the second server and the third server for information about the application instance, but may directly obtain the information about the application instance from the first server. Therefore, a signaling procedure in which the first device obtains the information about the application instance can be reduced, and further a network delay caused by increasing signaling can be reduced. In addition, the first server may further select, for the first device based on a requirement of the first device, an application instance that satisfies the requirement of the first device. Therefore, a process in which the first device obtains the information about the application instance is optimized.

According to the eleventh implementation of the first aspect, in a twelfth implementation of the first aspect of the embodiments of this application, the method further includes: when the IP address of the third instance is the IP address of the first instance, sending, by the first server, one or more of the following to the first device: the access identification information of the first edge network, the IP address of the first edge network, or the IP address of the first edge enabler server; or when the IP address of the third instance is the IP address of the second instance, sending, by the first server, one or more of the following to the first device: the access identification information of the second edge network, the IP address of the second edge network, or the IP address of the second edge enabler server.

In this implementation, it is proposed that the first server not only sends the IP address of the application instance to the first device, but also sends one or more of access identification information of an edge network, an IP address of the edge network, or an IP address of the edge enabler server to the first device. Therefore, diversity of information provided by the first server for the first device is increased, so that information that is about the application instance and that is sent by the first server to the first device can better satisfy the requirement of the first device.

According to the eleventh implementation of the first aspect or the twelfth implementation of the first aspect, in a thirteenth implementation of the first aspect of the embodiments of this application, the first device is a terminal device or an edge enabler server.

In this implementation, it is proposed that the first device may be the terminal device, or the first device may be the edge enabler server. Therefore, diversity of the first device is increased, so that the first device can be used as different devices or servers in different application scenarios to perform the foregoing method.

According to any one of the first aspect or the first implementation of the first aspect to the ninth implementation of the first aspect, in a fourteenth implementation of the first aspect of the embodiments of this application, the second server or the third server is any one of the following: an application instance management network element, where the application instance management network element is a network element configured to deploy the application instance, or an edge enabler server management network element, where the edge enabler server management network element is configured to manage the edge enabler server.

In this implementation, it is proposed that the second server and the third server may alternatively be network elements other than the edge networks, for example, application instance management network elements or edge enabler server management network elements. Therefore, the foregoing implementations are further applicable to a signaling exchange procedure between the first server and a network other than the edge networks.

According to a second aspect, an embodiment of this application provides an information obtaining method. The method is implemented by a first server and a second server. The second server obtains information about a first instance of an application, where the information about the first instance includes identification information of the application and first information, and the first information is used to indicate a location of the first instance; and the second server sends the information about the first instance to the first server, where the first server is a server serving the second server. When another device needs to obtain the information about the application instances, the another device may directly obtain the information about the application instances from the first server, and does not need to obtain the information about the application instances by querying the second server and the third server. Signaling overheads can be reduced, and a service delay can be reduced.

In this embodiment of this application, the second server may send the obtained information about the first instance of the application to the first server, so that the first server can store in time the information about the first instance sent by the second server. Therefore, this helps the first server store the information about the application instance in an edge network, so that the first server sends the information about the application instance to the another device (for example, a first device). In addition, in this way, the another device (for example, the first device) does not need to obtain the information about the application instance from the second server, but can directly obtain the information about the application instance from the first server. Therefore, a procedure in which the first server obtains the information about the application instance can be reduced.

According to the first aspect, in an implementation of the first aspect of the embodiments of this application, the second server sends area information of the second server to the first server.

According to the second aspect, in a first implementation of the second aspect of the embodiments of this application, the first information includes an internet protocol IP address of the first instance and one or more of the following: access identification information of a first edge network, an IP address of the first edge network, or an IP address of a first edge enabler server, where the second server is located in the first edge network.

In this implementation, the first information in the information about the first instance is further limited. The first information is used as an example. The first information further includes one or more of the access identification information of the first edge network, the IP address of the first edge network, or the IP address of the first edge enabler server in addition to the internet protocol IP address of the first instance. Therefore, a specific location of the first instance of the application may be determined by using information such as a plurality of pieces of identification information or IP addresses, so that the first server can also accurately determine the specific location of the first instance of the application when obtaining the information about the first instance of the application.

According to the second aspect or the first implementation of the second aspect, in a second implementation of the second aspect of the embodiments of this application, that the second server obtains information about a first instance of an application includes: receiving, by the second server, identification information of the first instance and the IP address of the first instance from a first instance server of the application; and obtaining, by the second server, the first information locally.

In this implementation, a manner in which the second server obtains the information about the first instance of the application is specified. The identification information of the first instance and the IP address of the first instance in the information about the first instance may be directly obtained by the second server from the first instance server of the application, and then the second server determines the first information. In such an implementation, the information about the first instance is obtained by the second server from different servers. Therefore, the second server can ensure integrity of the information about the first instance.

According to the second aspect or the first implementation of the second aspect, in a third implementation of the second aspect of the embodiments of this application, that the second server obtains information about a first instance of an application includes: receiving, by the second server, the information about the first instance from a first instance server of the application.

In this implementation, it is proposed that the second server may directly obtain the information about the first instance from the first instance server of the application, that is, the second server may directly obtain identification information of the first instance, the IP address of the first instance, and the first information from the first instance server. Therefore, a procedure in which the second server obtains the information about the first instance can be simplified.

According to the second aspect or any one of the first implementation of the second aspect to the third implementation of the second aspect, in a fourth implementation of the second aspect of the embodiments of this application, the method further includes: receiving, by the second server, a first application programming interface API discovery request from the first server, where the first API discovery request includes discovery type information, the discovery type information is used to indicate that the first API discovery request is used to request an application instance, or the discovery type information is used to indicate that the first API discovery request is used to request an application instance and an API, and the application instance includes the first instance.

In this implementation, it is proposed that a discovery mechanism in a common API framework CAPIF may be reused for signaling exchange between the first server and the second server. Specifically, the first server may send the first API discovery request to the second server, to trigger the second server to send the information about the first instance of the application to the first server. Therefore, the first server does not need to separately configure a request for obtaining the information about the application instance. This can reduce signaling overheads between the first server and the second server, and further can reduce an application access delay caused by increasing signaling.

According to the fourth implementation of the second aspect, in a fifth implementation of the second aspect of the embodiments of this application, that the second server sends the information about the first instance to the first server includes: sending, by the second server, a first API discovery response to the first server, where the first API discovery response includes the information about the first instance.

In this implementation, it is proposed that the discovery mechanism in the common API framework CAPIF is reused for signaling exchange between the first server and the second server, and it is also proposed that the information about the first instance sent by the second server to the first server is carried in the first API discovery response. Therefore, the first server may receive the information about the application instance from the second server by using existing signaling, and the second server does not need to separately configure a message for sending the information about the application instance. Therefore, signaling overheads can be reduced, and further an application access delay caused by increasing signaling can be reduced.

According to any one of the second aspect or the first implementation of the second aspect to the third implementation of the second aspect, in a sixth implementation of the second aspect of the embodiments of this application, that the second server sends the information about the first instance to the first server includes: sending, by the second server, a first API publish request to the first server, where the first API publish request includes the information about the first instance of the application, and the first API publish request is used to publish an API and/or the first instance.

In this implementation, it is proposed that a publish mechanism in a common API framework CAPIF may be reused for signaling exchange between the first server and the second server, and it is also proposed that the information about the first instance sent by the second server to the first server is carried in the first API publish request. Therefore, the first server may receive the information about the application instance from the second server by using existing signaling, and the second server does not need to separately configure a message for sending the information about the application instance. Therefore, signaling overheads can be reduced, and further an application access delay caused by increasing signaling can be reduced.

According to the sixth implementation of the second aspect, in a seventh implementation of the second aspect of the embodiments of this application, the first API publish request further includes publish type information, the publish type information is used to indicate to publish an application instance and/or publish the API, and the application instance includes the first instance.

In this implementation, it is proposed that the first API publish request and the second publish request each further include the publish type information, and the publish type information is used to indicate a type of published content. Therefore, the first server may determine, based on the publish type information, whether the information carried in the first API publish request includes the information about the application instance.

According to the sixth implementation of the second aspect or the seventh implementation of the second aspect, in an eighth implementation of the second aspect of the embodiments of this application, that the second server obtains information about a first instance of an application includes: receiving, by the second server, a third API publish request from the first instance server of the application, where the third API publish request includes the identification information of the first instance and the IP address of the first instance, and the third API publish request is used to publish the API and/or the first instance.

In this implementation, it is proposed that signaling exchange between the first server and the second server may be based on a subscribe-notification mechanism, that is, the first server subscribes to the information about the application instance from the second server. In this case, when the information about the application instance in the second server is updated, the second server sends the information about the application instance to the first server. Therefore, the first server only needs to send a message to the second server once, to receive the information about the application instance from the second server. Therefore, the signaling overheads can be reduced, and further an application access delay caused by increasing signaling can be reduced.

According to any one of the second aspect or the first implementation of the second aspect to the third implementation of the second aspect, in a ninth implementation of the second aspect of the embodiments of this application, before that the second server sends the information about the first instance to the first server, the method further includes: receiving, by the second server, a subscription request from the first server, where the subscription request is used to request to subscribe to the information about the application instance.

According to the ninth implementation of the second aspect, in a tenth implementation of the second aspect of the embodiments of this application, the subscription request includes a subscription condition, the subscription condition is used to indicate an application instance, and the application instance includes the first instance.

In this implementation, the subscription condition may be carried in the subscription request, to indicate that content to which the first server requests to subscribe is the information about the application instance or indicate a type of the application instance to which the first server requests to subscribe.

According to any one of the second aspect or the first implementation of the second aspect to the tenth implementation of the second aspect, in an eleventh implementation of the second aspect of the embodiments of this application, the information about the first instance of the application further includes one or more of the following: identification information of the first edge enabler server or service range information of the first instance.

In this implementation, it is proposed that the information about the application instance may further include identification information of an edge enabler server or service range information of the application instance. The identification information of the edge enabler server is used to identify an identity of the edge enabler server, so that another server or the first device can accurately search for the edge enabler server. The service range information of the application instance is used to indicate a range of a user that uses the application instance, or may refer to a possible location of a user served by the application instance. Therefore, in this implementation, a specific implementation of the information about the application instance is extended, so that the information about the application instance is applicable to a requirement of a specific scenario.

According to any one of the second aspect or the first implementation of the second aspect to the eleventh implementation of the second aspect, in a twelfth implementation of the second aspect of the embodiments of this application, the first server is an edge network configuration server.

In this implementation, a specific implementation of the first server in an edge network is specified, and the first server may be the edge network configuration server in the edge network.

According to any one of the second aspect or the first implementation of the second aspect to the twelfth implementation of the second aspect, in a thirteenth implementation of the second aspect of the embodiments of this application, the second server is any one of the following: an edge enable server or a network management server in an edge network.

In this implementation, specific implementations of the second server are specified. The second server may be a same server in the foregoing plurality of types of servers, or may be different servers in the foregoing plurality of types of servers. Because the second server may have a plurality of implementations, solution diversity is increased.

According to any one of the second aspect, the first implementation of the second aspect, or the fourth implementation of the second aspect to the twelfth implementation of the second aspect, in a fourteenth implementation of the second aspect of the embodiments of this application, the second server is any one of the following: an application instance server, where the application instance server includes the first instance server of the application or a second instance server of the application; or an operation support system OSS network element.

According to any one of the second aspect or the first implementation of the second aspect to the twelfth implementation of the second aspect, in a fifteenth implementation of the first aspect of the embodiments of this application, the second server is any one of the following: an application instance management network element, where the application instance management network element is a network element configured to deploy the application instance; or an edge enabler server management network element, where the edge enabler server management network element is configured to manage the edge enabler server.

In this implementation, it is proposed that the second server may alternatively be a network element other than the edge network, for example, the application instance management network element or the edge enabler server management network element. Therefore, the foregoing implementations are further applicable to a signaling exchange procedure between the first server and a network other than the edge network.

According to a third aspect, an embodiment of this application provides an information obtaining apparatus. The information obtaining apparatus may implement a function of the first server in the foregoing methods. The function may be implemented by using hardware, or may be implemented by hardware executing corresponding software. The hardware or the software includes one or more modules corresponding to the function. In a possible design, a structure of the information obtaining apparatus includes a processor and a transceiver. The processor is configured to enable the information obtaining apparatus to perform a corresponding function in the foregoing methods. The transceiver is configured to implement communication between the information obtaining apparatus and a second server or a third server. The information obtaining apparatus may further include a memory, where the memory is coupled to the processor, and the memory stores program instructions and data that are necessary for the information obtaining apparatus.

According to a fourth aspect, an embodiment of this application provides an information obtaining apparatus. The information obtaining apparatus may implement a function of the second server in the foregoing methods. The function may be implemented by using hardware, or may be implemented by hardware executing corresponding software. The hardware or the software includes one or more modules corresponding to the function. In a possible design, a structure of the information obtaining apparatus includes a processor and a transceiver. The processor is configured to enable the information obtaining apparatus to perform a corresponding function in the foregoing methods. The transceiver is configured to implement communication between the information obtaining apparatus and a first server and communication between the information obtaining apparatus and an application instance server. The information obtaining apparatus may further include a memory, where the memory is coupled to the processor, and the memory stores program instructions and data that are necessary for the information obtaining apparatus.

According to a fifth aspect, an embodiment of this application provides an information obtaining apparatus. The information obtaining apparatus may be a first server, or may be a chip in the first server. The information obtaining apparatus may include a processing module and a transceiver module. When the information obtaining apparatus is the first server, the processing module may be a processor, and the transceiver module may be a transceiver. The first server may further include a storage module, and the storage module may be a memory. The storage module is configured to store instructions. The processing module executes the instructions stored in the storage module, so that the first server performs the method according to any one of the first aspect or the implementations of the first aspect. When the information obtaining apparatus is the chip in the first server, the processing module may be a processor, and the transceiver module may be an input/output interface, a pin, a circuit, or the like. The processing module executes instructions stored in a storage module, so that the first server performs the method according to any one of the first aspect or the implementations of the first aspect. In addition, the storage module may be a storage module (for example, a register or a cache) in the chip, or may be a storage module located outside the chip in the first server (for example, a read-only memory or a random access memory).

According to a sixth aspect, an embodiment of this application provides an information obtaining apparatus. The information obtaining apparatus may be a second server, or may be a chip in the second server. The information obtaining apparatus may include a processing module and a transceiver module. When the information obtaining apparatus is the second server, the processing module may be a processor, and the transceiver module may be a transceiver. The information obtaining apparatus of vehicle to everything may further include a storage module, and the storage module may be a memory. The storage module is configured to store instructions. The processing module executes the instructions stored in the storage module, so that the second server performs the method according to any one of the second aspect or the implementations of the second aspect. When the information obtaining apparatus is the chip in the second server, the processing module may be a processor, and the transceiver module may be an input/output interface, a pin, a circuit, or the like. The processing module executes instructions stored in a storage module, so that the second server performs the method according to any one of the second aspect or the implementations of the second aspect. The storage module may be a storage module (for example, a register or a cache) in the chip, or may be a storage module located outside the chip in the second server (for example, a read-only memory or a random access memory).

According to a seventh aspect, an embodiment of this application provides a communication system. The communication system includes a first server, a second server, and a third server. The second server is configured to obtain information about a first instance of an application. The third server is configured to obtain information about a second instance of the application. The first server is configured to receive information about the first instance of the application and information about the second instance of the application from the second server and the third server, and store the information about the first instance of the application and the information about the second instance of the application.

According to the seventh aspect, in a first implementation of the seventh aspect of the embodiments of this application, a network device of the vehicle to everything may implement a function of the network device in the fifth aspect, the seventh aspect, or the ninth aspect.

According to the seventh aspect or the first implementation of the seventh aspect, in a second implementation of the seventh aspect of the embodiments of this application, the first server may implement a function of the first server in any one of the first aspect or the implementations of the first aspect.

According to the seventh aspect or the first implementation of the seventh aspect, in a third implementation of the seventh aspect of the embodiments of this application, the second server may implement a function of the second server in any one of the second aspect or the implementations of the second aspect.

According to an eighth aspect, an embodiment of this application provides a computer program product including instructions. When the computer program product runs on a computer, the computer is enabled to perform the method according to any one of the first aspect or the implementations of the first aspect or any one of the second aspect or the implementations of the second aspect.

According to a ninth aspect, an embodiment of this application provides a computer-readable storage medium, including instructions. When the instructions are run on a computer, the computer is enabled to perform the method according to any one of the first aspect or the implementations of the first aspect or any one of the second aspect or the implementations of the second aspect.

It can be learned from the foregoing technical solutions that the embodiments of this application have the following advantages.

In the embodiments of this application, because the first server that manages the information about the application instances may respectively receive the information about the first instance of the application and the information about the second instance of the application from the second server and the third server, and store the information about the first instance of the application and the information about the second instance of the application in the first server, the problem of storing the information about the application instances in the edge networks is resolved, so that the first server sends the information about the application instances to the another device (for example, the first device). When the another device needs to obtain the information about the application instances, the another device may directly obtain the information about the application instances from the first server, and does not need to obtain the information about the application instances by querying the second server and the third server. The signaling overheads can be reduced, and the service delay can be reduced.

BRIEF DESCRIPTION OF DRAWINGS

To describe the technical solutions in the embodiments of this application more clearly, the following briefly describes the accompanying drawings used in describing the embodiments. Apparently, the accompanying drawings in the following descriptions show merely some embodiments of this application.

DESCRIPTION OF EMBODIMENTS

Figure 1A:
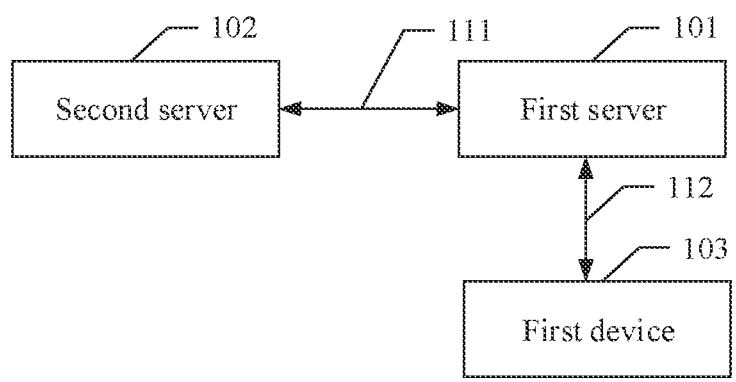
FIG. 1A is a diagram of a system architecture according to an embodiment of this application.

The following clearly and completely describes the technical solutions in the embodiments of this application with reference to the accompanying drawings in the embodiments of this application. It is clear that the described embodiments are merely some but not all of the embodiments of this application.

In this specification, the claims, and the accompanying drawings of this application, terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments described herein can be implemented in orders other than the order illustrated or described herein. In addition, the terms "include", "have", and any variant thereof are intended to cover non-exclusive inclusion. For example, a process, method, system, product, or device that includes a list of steps or units is not necessarily limited to those expressly listed steps or units, but may include other steps or units not expressly listed or inherent to such a process, method, product, or device.

The embodiments of this application provide an information obtaining method, used to obtain and store information about application instances, so that a user can directly obtain the information about the application instances from a first server, and does not need to obtain the information about the application instances by querying a second server and a third server. Signaling overheads can be reduced, and a service delay can be reduced.

For ease of understanding, the following first explains some technical terms in the embodiments of this application.

An application (application) refers to a program that is run on a terminal device or a server, so that a user can obtain a service provided by the application. A program that is run on the terminal device is referred to as an application client program, and a program that is run on the server is referred to as an application server program. The application in the embodiments of this application refers to the application server program.

An instance (instance) is an application instance, and is a running instance of the application server program in the server. Different instances of a same application may be run on servers in different edge networks. It may be understood as that the application instance is a program that is run on an application instance server. For ease of understanding, an example in which the application is HUAWEI Video is used to describe the foregoing application and the application instance.

An application programming interface (application programming interface, API) may also be referred to as an application programming interface, and is a convention for connecting different components of a software system. The API specifies a manner in which software that is run on an end system (for example, a terminal device or a server) requests an internet infrastructure to deliver data to software that is at a specific destination and that is run on another end system (for example, another terminal device or another server).

For ease of understanding, the following first describes a system architecture and an application scenario of the information obtaining method provided in the embodiments of this application.

The solutions provided in the embodiments of this application are mainly based on a 5th generation mobile communication (the 5th generation, 5G) technology or a new radio technology, or may be based on a subsequent evolved access standard. This is not specifically limited herein. In this embodiment and subsequent embodiments, only a 5G-based communication system is used as an example for description.

FIG. 1A is a diagram of a system architecture applicable to an information obtaining method. A system mainly includes a first server 101, a second server 102, and a first device 103.

The second server 102 is configured to determine information about an application instance, and the information about the application instance may be generated by the second server 102, or may be obtained by the second server 102 from another server.

The first server 101 is configured to obtain the information about the application from the second server 102, and store the information, so that the first device 103 uses the information. Specifically, the first server 101 is connected to the second server 102 by using a first interface 111. Therefore, the first server 101 may obtain, from the second server 102, the information that is about the application and that is stored in the second server 102. The first server 101 is connected to the first device 103 by using a second interface 112. Therefore, the first server 101 may send information stored in the first server 101 to the first device 103. The information that is about an application and that is stored in the first server 101 may include the information that is about the application and that is obtained from the second server 102.

The first device 103 may be a terminal device, may be a server, or may be another device that needs to obtain the information about the application from the first server 101 by using the second interface 112. A specific name is not limited herein.

Specifically, when the first device 103 is the terminal device, the first device may be a terminal device that can use an application provided by an application instance server.

The terminal device includes a device that provides a user with voice and/or data connectivity, for example, may include a handheld device with a wireless connection function or a processing device connected to a wireless modem. The terminal device may communicate with a core network through a radio access network (radio access network, RAN), and exchange a voice and/or data with the RAN. The terminal device may include user equipment (user equipment, UE), a wireless terminal device, a mobile terminal device, a subscriber unit (subscriber unit), a subscriber station (subscriber station), a mobile station (mobile station), a mobile station (mobile), a remote station (remote station), an access point (access point, AP), a remote terminal device (remote terminal), an access terminal device (access terminal), a user terminal device (user terminal), a user agent (user agent), a user device (user device), or the like. For example, the terminal device may include a device such as a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). In addition, in a vehicle to everything scenario, the terminal device may be a vehicle-mounted terminal, a roadside terminal, or a wearable device. In addition, in an internet of things scenario, the terminal device may be a limited device, for example, a terminal device with low power consumption, a terminal device with a limited storage capability, or a terminal device with a limited computing capability. This is not specifically limited herein.

In addition, when the first device 103 is the server, the first device 103 may be an edge enabler server, and the edge enabler server is configured to provide an enabler capability (enabler capability) or enabler service (enabler service) for an application instance deployed in an edge network, to better support deployment of the application in MEC. The foregoing enabler capability or enabler service may be from a third generation partnership project (the 3rd generation partnership project, 3GPP) network, or may be from the edge enabler server.

It should be further understood that the first device 103 in this embodiment of this application may be a device, a chip in the device, a server, or a chip in the server in any one of the foregoing scenarios. This is not specifically limited herein. Regardless of being used as the device or the chip, the first device 103 may be manufactured, sold, or used as an independent product.

Figure 1B:
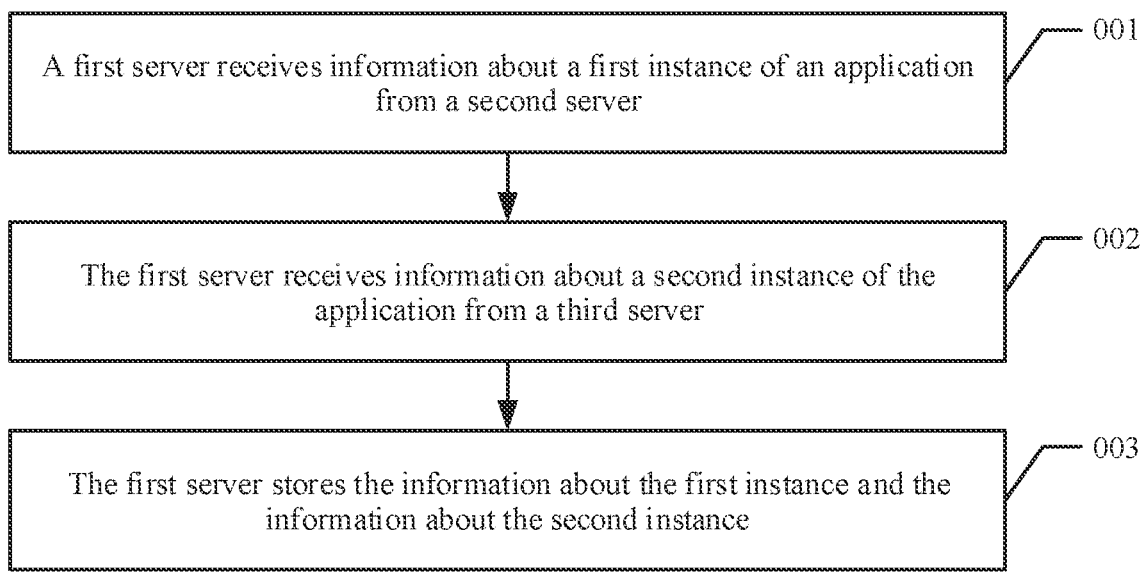
FIG. 1B is a flowchart of an information obtaining method according to an embodiment of this application.

Based on the system architecture shown in FIG. 1A, as shown in FIG. 1B, a main procedure of an information obtaining method provided in an embodiment of this application includes the following steps.

001: The first server receives information about a first instance of an application from the second server.

It can be learned from the foregoing system architecture that the second server is configured to determine information about an application instance, and the information about the application instance may be generated by the second server, or may be obtained by the second server from another server. In addition, the first server is connected to the second server by using the foregoing first interface 111. For ease of description, the information that is about the application instance and that is determined by the second server is referred to as the information about the first instance. Then, the first server may receive the information about the first instance of the application from the second server.

The information about the first instance includes identification information of the application and first information. The identification information of the application is used to identify the application. The first information is used to indicate a location of the first instance. Details are described in the following step 201a. Details are not described herein again.

002: The first server receives information about a second instance of the application from a third server.

In this embodiment, in addition to the foregoing second server, the third server may be connected to the first server. The third server is similar to the second server. The third server is configured to determine information about an application instance, and the information about the application instance may be generated by the third server, or may be obtained by the third server from another server. For ease of description, the information that is about the application instance and that is determined by the third server is referred to as the information about the second instance. The information about the second instance includes the identification information of the application and second information. The second information is used to indicate a location of the second instance.

In addition, the first server is a server serving the foregoing second server and the foregoing third server.

It should be noted that there is no definite limitation on a time sequence of step 001 and step 002. In other words, step 001 may be performed before step 002, step 001 may be performed after step 002, or step 001 and step 002 may be performed simultaneously. This is not specifically limited herein.

003: The first server stores the information about the first instance and the information about the second instance.

When the first server obtains the information about the first instance, the first server may store the information about the first instance in the first server. When the first server obtains the information about the second instance, the second server may store the information about the second instance in the first service. Because there is no definite limitation on the time sequence of step 001 and step 002, there is no definite limitation on a time sequence of a step in which the first server stores the information about the first instance and a step in which the first server stores the information about the second instance. In other words, the first server may first store the information about the first instance and then store the information about the second instance, the first server may first store the information about the second instance and then store the information about the first instance, or the first server may store the information about the first instance and the information about the second instance simultaneously. This is not specifically limited herein.

In this embodiment, the foregoing first server may be an edge network configuration server or another server. This is not specifically limited herein. The foregoing second server or the third server is any server or network element in an edge enabler server, a network management server in an edge network, an application instance server, an operation support system (operation support systems, OSS) network element, an application instance management network element, or an edge enabler server management network element. This is not specifically limited herein. Details are described below. For details, refer to an embodiment corresponding to FIG. 2 below.

In addition, the second server and the third server may be a same type of servers. For example, both the second server and the third server may be edge enabler servers. Alternatively, the second server and the third server may be different types of servers. For example, the second server is the edge enabler server, and the third server is the network management server in the edge network. This is not specifically limited herein.

In this embodiment, the first server may respectively receive the information about the first instance of the application and the information about the second instance of the application from the second server and the third server, and store the information about the first instance of the application and the information about the second instance of the application in the first server. Therefore, a problem of storing information about application instances in edge networks is resolved, so that the first server sends the information about the application instances to the another device (for example, the first device 103). When the another device needs to obtain the information about the application instances, the another device may directly obtain the information about the application instances from the first server, and does not need to obtain the information about the application instances by querying the second server and the third server. Signaling overheads can be reduced, and a service delay can be reduced.

In the system shown in FIG. 1A, the second server 102 may be configured to generate the information about the application instance, and may be configured to obtain the information about the application instance from the another server. When the second server 102 is configured to generate the information about the application instance, the second server 102 is the application instance server. When the second server 102 is configured to obtain the information about the application instance from the another server, a diagram of a system architecture to which the information obtaining method is adapted may be further shown in FIG. 1C.

Figure 1C:
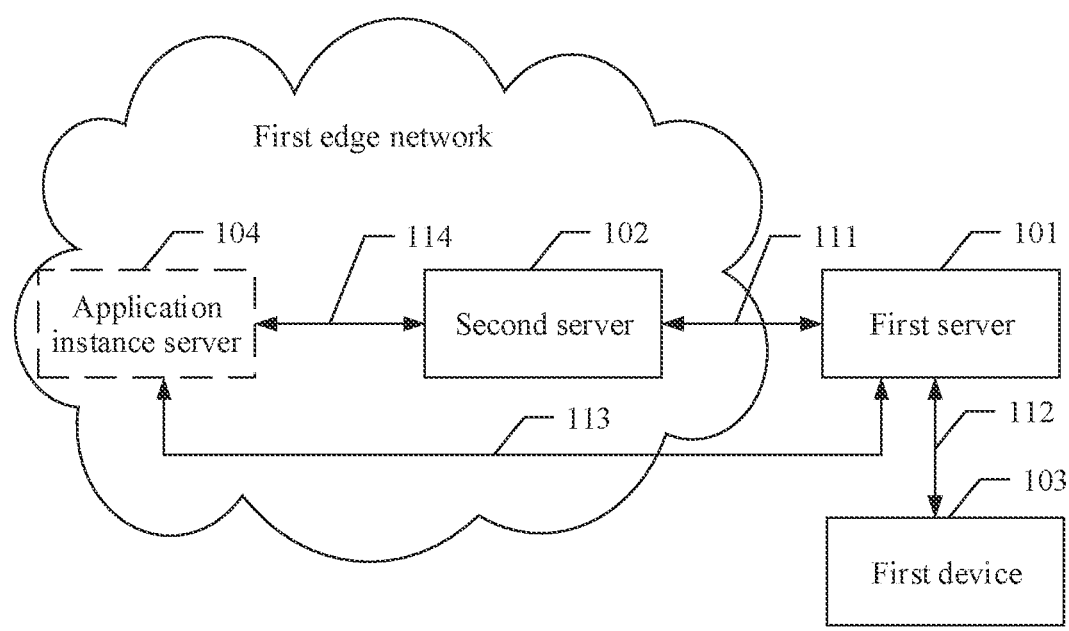
FIG. 1C is a diagram of another system architecture of an information obtaining method according to an embodiment of this application.

A system shown in FIG. 1C further includes an application instance server 104 in addition to the foregoing first server 101, the foregoing second server 102, and the foregoing first device 103. The application instance server 104 is configured to generate information about an application instance. The application instance server 104 is connected to the second server 102 by using a fourth interface 114. The application instance server 104 may transmit the information about the instance to the second server 102, or the second server 102 obtains the information about the instance in the application instance server 104 by using the fourth interface 114.

In addition, the application instance server 104 is further connected to the first server 101 by using a third interface 113. The application instance server 104 may transmit the information about the instance to the first server 101, or the first server 101 obtains the information about the instance in the application instance server 104 by using the third interface 113.

It should be understood that the second server 102 and the application instance server 104 in FIG. 1C are located in a first edge network (edge network). The edge network may also be referred to as an edge computing network (edge computing network), and is used to represent an application deployment issue, for example, a local data center. In some implementations, the edge network may alternatively be an edge data network (edge data network, EDN). In this embodiment and subsequent embodiments, only the edge network is used as an example for description. In addition, it should be understood that the edge network may include some or all capabilities of the foregoing edge computing network or the edge data network. This is not specifically limited herein.

There may be a plurality of second servers 102 and a plurality of application instance servers 104 in the edge network. In addition, each application instance server 104 may be managed by only one corresponding second server 102. This may also be understood as that the application instance server 104 may be served by only the corresponding second server 102, or may also be understood as that the application instance server 104 may obtain service from only the corresponding second server 102. During actual application, the second server 102 serves application instance servers 104 of one or more applications. The second server 102 may be an edge enabler server (edge enabler server, EES) or another entity that has a function of providing edge enabler service for the application instance servers 104 of the one or more applications. A specific implementation form of the second server is not limited herein. The first server 101 may be an edge network configuration server (edge network configuration server). In some implementations, the edge network may alternatively be an edge data network configuration server (edge data network configuration server) or another functional entity that may have a function of the first server. A specific implementation form of the first server is not limited herein.

Figure 1D:
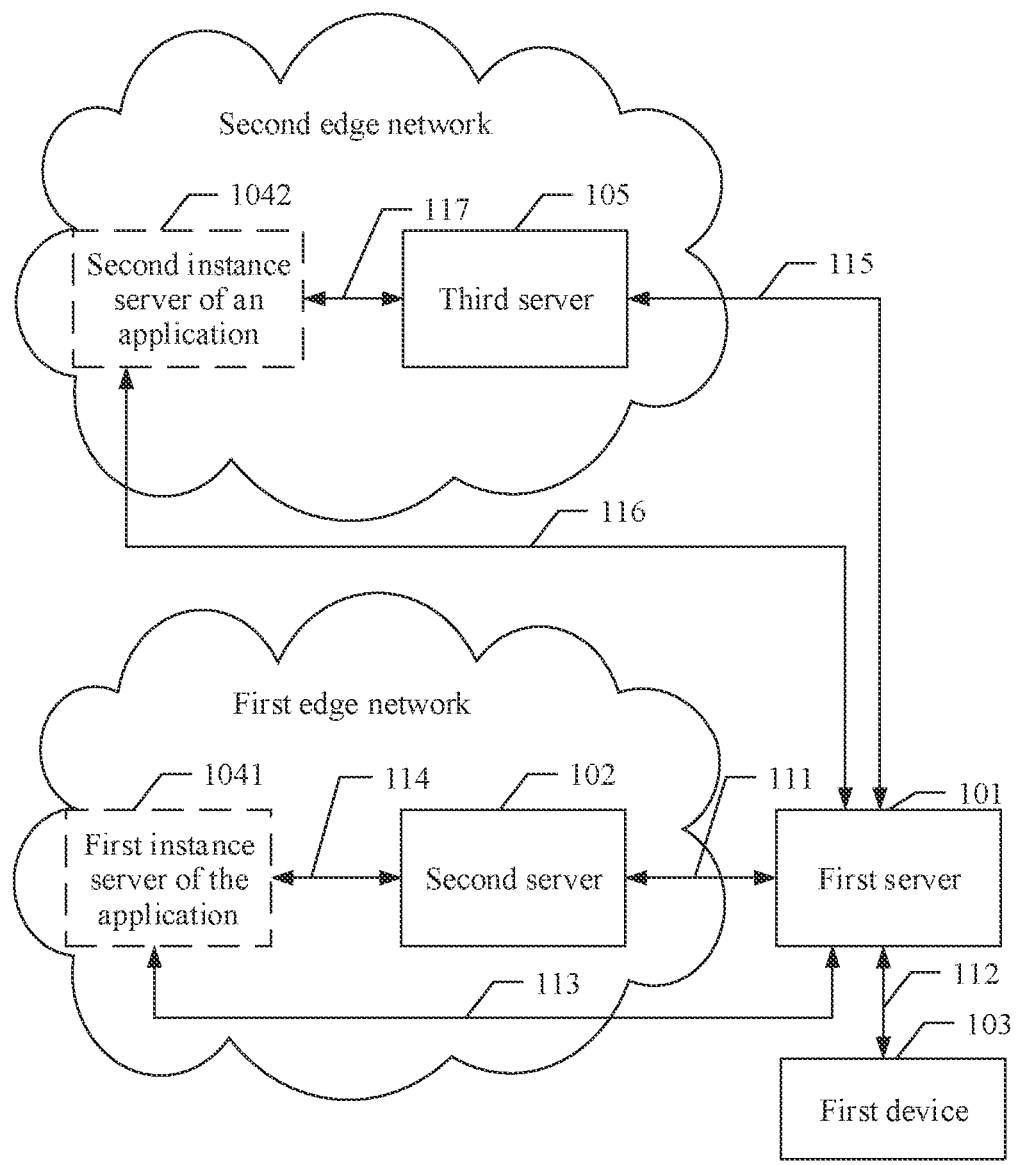
FIG. 1D is a diagram of another system architecture of an information obtaining method according to an embodiment of this application.

It should be further understood that the first server 101 may further be connected to another edge network. That is, the first server may serve a plurality of edge networks. Details are shown in FIG. 1D. In this case, the first server 101 is connected to the first edge network and a second edge network. For ease of description, the foregoing application instance server that is in the first edge network and that is connected to the second server 102 by using the fourth interface 114 is referred to as a first instance server 1041 of an application. An application instance server that is in the second edge network and that is connected to a third server 105 by using a seventh interface 117 is referred to as a second instance server 1042 of the application.

Specifically, the third server 105 in the second edge network is connected to the first server 101 by using a fifth interface 115, the third server 105 is connected to the second instance server 1042 of the application by using the seventh interface 117, and the second instance server 1042 of the application is connected to the first server 101 by using a sixth interface 116. Specifically, the second instance server 1042 of the application is similar to the foregoing application instance server 104, and the third server 105 is similar to the second server 102. Details are not described herein again.

In addition, the first server, the second server, or the third server in this embodiment of this application may be a server or a chip in the server. This is not specifically limited herein. Regardless of being used as the server or the chip, the first server, the second server, or the third server may be manufactured, sold, or used as an independent product.

The foregoing describes the system architecture in an embodiment of this application. The following describes, with reference to the foregoing system architecture, a method provided in this embodiment of this application.

Figure 2:
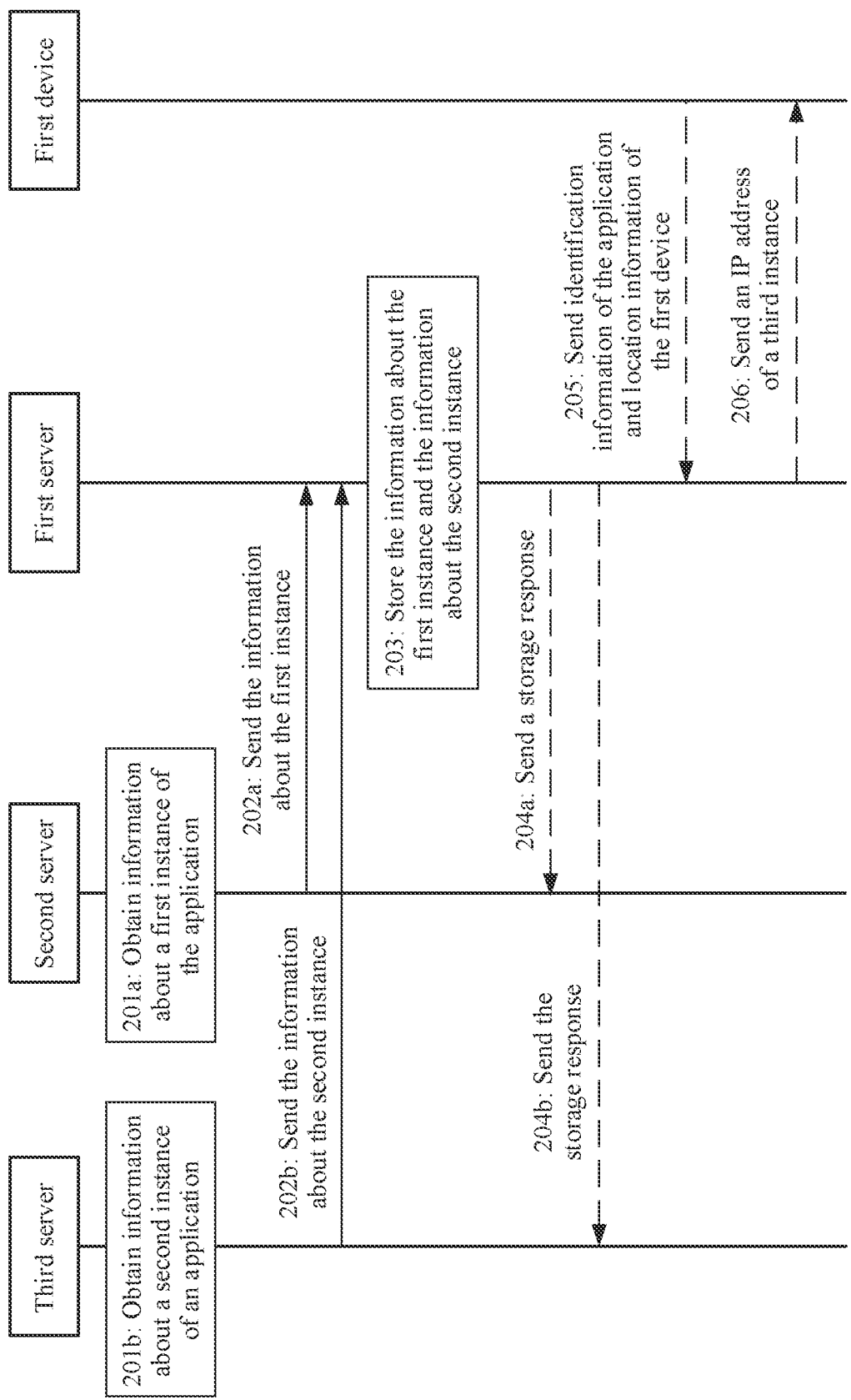
FIG. 2 is another flowchart of an information obtaining method according to an embodiment of this application.

It should be understood that, FIG. 1D of the foregoing system architecture shows only that the first server is connected to the second server in the first edge network, and the first server is connected to the third server in the second edge network. However, it should be understood that there may further be a plurality of second servers in the first edge network, there may further be a plurality of third servers in the second edge network, the first server may further be connected to another edge network or data network (for example, a third edge network), there may further be another server (for example, a fourth server) in the another edge network or data network, and so on. This is not specifically limited herein. In this embodiment and subsequent embodiments, only information exchange between the first server and the second server and information exchange between the first server and the third server are used as an example for description. Specifically, as shown in FIG. 2, the information obtaining method includes the following steps.

201*a*: The second server obtains information about a first instance of an application.

In this embodiment, the second server is a server serving an application instance (application instance). When the second server is a server serving a plurality of application instances, the plurality of application instances may be different instances of a same application, or the plurality of application instances may be different instances belonging to different applications. This is not specifically limited herein. In this embodiment and subsequent embodiments, only that the plurality of application instances are the different instances of the same application is used as an example for description. Therefore, for an application deployed in an edge network in which the second server is located, the second server may obtain information about one or more instances of the application. The application (application) refers to a program that is run on a terminal device or a server, so that a user can interact with the terminal device by performing an operation, to obtain a service provided by the application. A program that is run on the terminal device is referred to as an application client program, and a program that is run on the server is referred to as an application server program. The application in the embodiments of this application refers to the application server program. The application instance refers to a running instance (instance) of the application server program in the server, and different instances of a same application may be run on servers in different edge networks. It may be understood as that the application instance is a program that is run on an application instance server. For ease of understanding, an example in which the application is HUAWEI Video is used to describe the foregoing application and the application instance. In this case, if HUAWEI Video servers are centrally deployed in Shenzhen (that is, a server program of HUAWEI Video is run on servers deployed in Shenzhen, where the server program can be referred to as cloud of a HUAWEI Video application), and when an operator sets a Beijing data center in Beijing, and the Beijing data center may provide a running environment of the Huawei video application servers, the HUAWEI Video application may run an application server program of HUAWEI Video on a server deployed in the Beijing data center. In this case, the application server program of HUAWEI Video run on the Huawei application server deployed in the Beijing data center may be referred to as an application instance of HUAWEI Video (referred to as "HUAWEI Video-Beijing instance" for short), and the server is a HUAWEI Video application instance server. Therefore, a HUAWEI Video client close to the data center may be connect to Huawei Video-Beijing instance to access content provided by HUAWEI Video. The foregoing explanation of the application and the application instance is also applicable to other embodiments of the present invention.

Specifically, the second server obtains the information about the first instance of the application, where the information about the first instance includes identification information of the application and first information, and the first information is used to indicate a location of the first instance of the application.

The identification information of the application is used to identify the application. For example, the identification information of the application may be a name of the application, a sequence number that uniquely identifies the application, or another character string that can uniquely identify the application. This is not specifically limited herein. For example, an identity of the application may be one or more of the following: an application identifier (application ID), a uniform resource locator (uniform resource locator, URL), a fully qualified domain name (fully qualified domain name, FQDN), and an application name (application name). For example, the first information includes an internet protocol IP address of the first instance, and the IP address of the first instance may be a virtual IP address or an internal network IP address of the first edge network. This is not specifically limited herein. In addition, the first information may further include one or more of the following: access identification information of the first edge network or an IP address of the first edge network. The access identification information of the first edge network is also referred to as a first data network access identifier (data network access identifier, DNAI), and represents a user plane access point for accessing one or more data networks (data network, DN) in which an application program is deployed. The IP address of the first edge network is an IP address of the edge network in which the second server is located, and may be an IP address segment. In addition, when the second server is an edge enabler server, the first information may further include an IP address of a first edge enabler server, where the first edge enabler server is a server that provides edge enabler service for the first instance of the application.

Optionally, the information about the first instance further includes identification information of the first edge enabler server or service range information of the first instance in addition to the identification information of the application and the first information. The first edge enabler server is the foregoing server that provides the edge enabler service for the first instance of the application, and the identification information of the first edge enabler server is used to identify the first edge enabler server, so that another server or a first device can accurately search for the first edge enabler server. The service range information of the first instance is used to indicate a range of an application service that can be provided by using the first instance of the application. The range may be a subset of a coverage area of the first edge network. Specifically, the service range information of the first instance may be a group of tracking area identities (tracking area identity, TAI), may be identification information of a cell, for example, a cell ID (cell ID) or a cell list (cell ID list), or may be latitude and longitude, administrative area information, or the like. This is not specifically limited herein.

When the second server obtains the information about the first instance of the application, the second server may use different implementations. Details are as follows.

In an implementation, the second server receives identification information of the first instance and the IP address of the first instance from the first instance server of the application, and the second server obtains other information in the first information from local information of the second server. For example, if second servers are also located in a same first edge network, one or more of the access identification information of the first edge network, the IP address of the first edge network, or an IP address of the second server are stored in the local information of the second server. In this case, the second server may obtain the information about the first instance of the application.

In another implementation, the second server may directly receive the information about the first instance from the first instance server of the application.

During actual application, the second server may obtain the information about the first instance by using any one of the foregoing implementations. This is not specifically limited herein.

201b: The third server obtains information about a second instance of the application.

In this embodiment, the third server is similar to the foregoing second server, and the third server is also a server serving an application instance (application instance). When the third server is a server serving a plurality of application instances, the plurality of application instances may be different instances of a same application, or the plurality of application instances may be different instances belonging to different applications. This is not specifically limited herein. In this embodiment and subsequent embodiments, only that the plurality of application instances are the different instances of the same application is used as an example for description. Therefore, for an application deployed in an edge network in which the third server is located, the third server may obtain information about one or more instances of the application. However, the application instance served (serving) by the third server is different from the application instance served (serving) by the second server. For ease of description, the application instance served by the third server is referred to as the second instance. It should be understood that the foregoing second instance and a third instance are merely named to distinguish between different instances, and a name serviced by the second server and a name serviced by the third server are not limited.

Specifically, the third server obtains the information about the second instance of the application, where the information about the second instance includes the identification information of the application and second information, and the second information includes an internet protocol IP address of the second instance. In addition, the second information may further include one or more of the following: access identification information of the second edge network or an IP address of the second edge network. When the second server is an edge enabler server, the second information may further include an IP address of the second edge enabler server. When the third server obtains the information about the second instance of the application, the third server may use the following different implementations.

In an implementation, the third server receives identification information of the second instance and the IP address of the second instance from the second instance server of the application, and the third server obtains other information in the second information from local information of the third server. For example, if third servers are also located in a same first edge network, one or more of the access identification information of the second edge network, the IP address of the second edge network, or an IP address of the third server are stored in the local information of the third server. In this case, the third server may obtain the information about the second instance of the application.

In another implementation, the second instance server corresponding to the second instance stores the second information. Therefore, the third server may directly receive the information about the second instance from the second instance server of the application.

The information about the second instance of the application further includes one or more of the following: identification information of the second edge enabler server or service range information of the second instance.

Specifically, step 201b is similar to step 201a. Details are not described herein again.

It should be noted that there is no definite limitation on a time sequence of step 201a and step 201b. In other words, step 201a may be performed before step 201b, step 201a may be performed after step 201b, or step 201a and step 201b may be performed simultaneously. This is not specifically limited herein.

202a: The second server sends the information about the first instance to the first server.

In this embodiment, after the second server obtains the information about the first instance of the application, the second server may send the information about the first instance to the first server. Correspondingly, the first server may receive the information about the first instance from the second server. That the first server is a server serving (serving) the second server and the third server may be understood as that the first server may provide configuration information of the corresponding edge networks for the second server and the third server, or may be understood as that an address of the first server is configured for the third server and the second server, and the third server and the second server may be connected to the first server. Specifically, the first server may obtain information about different instances of the application from the second server and the third server. During actual application, the first server not only serves the foregoing second server and the foregoing third server, but also may serve another server.

In addition, it should be noted that the information about the first instance received by the first server from the second server may be carried in a message that is based on a request-response (request-response) mechanism. For example, the first server sends a request message to the second server, the second server returns a response message to the first server, and the response message carries the information about the first instance. Alternatively, the information about the first instance received by the first server from the second server may be carried in a message that is based on a subscribe-notification (subscribe-notification) mechanism. For example, the first server sends a subscription message to the second server, and the subscription message is used to subscribe to the information about the application instance in the second server. The second server returns one or more notification messages that are based on the subscription message to the first server, and each notification message carries the information about the first instance of the application. For example, each time the information about the application instance in the second server is updated, the second server sends a notification message to the first server once. It should be understood that updating in this embodiment may mean that the information about the application instance appears in the second server for the first time. For example, the second server obtains the information about the first instance of the application for the first time. Alternatively, updating in this embodiment may mean that the information about the application instance in the second server does not increase or decrease but changes. For example, the IP address of the first instance in the information about the first instance in the second server changes from an IP address A to an IP address B. Alternatively, updating in this embodiment may mean that all or some of the information about the application instance is deleted from the second server or invalidated. For example, the service range information of the first instance in the information about the first instance changes from the tracking area identity TAI and the identification information of the cell to only the tracking area identity TAI. This is not specifically limited herein.

202b: The third server sends the information about the second instance to the first server.

In this embodiment, after the third server obtains the information about the second instance of the application, the third server may send the information about the second instance to the first server. Therefore, the first server may receive the information about the second instance from the third server. Specifically, the information about the second instance received by the first server from the third server may be carried in the message that is based on the request-response (request-response) mechanism, or may be carried in the message that is based on the subscribe-notification (subscribe-notification) mechanism. Specifically, this is similar to step 202a. Details are not described herein again.

It should be noted that there is no definite limitation on a time sequence of step 202a and step 202b. In other words, step 202a may be performed before step 202b, step 202a may be performed after step 202b, or step 202a and step 202b may be performed simultaneously. This is not specifically limited herein.

203: The first server stores the information about the first instance and the information about the second instance.

When the first server obtains the information about the first instance, the first server may store the information about the first instance in the first server. When the first server obtains the information about the second instance, the second server may store the information about the second instance in the first service. Because there is no definite limitation on the time sequence of step 202a and step 202b, there is no definite limitation on a time sequence of a step in which the first server stores the information about the first instance and a step in which the first server stores the information about the second instance. In other words, the first server may first store the information about the first instance and then store the information about the second instance, the first server may first store the information about the second instance and then store the information about the first instance, or the first server may store the information about the first instance and the information about the second instance simultaneously. This is not specifically limited herein.

In this embodiment, the first server may respectively receive the information about the first instance of the application and the information about the second instance of the application from the second server and the third server, and store the information about the first instance of the application and the information about the second instance of the application in the first server. Therefore, a problem of storing information about application instances in edge networks is resolved, so that the first server sends the information about the application instances to another device (for example, the first device). When the first device needs to query and obtain the information about the application instance, the first device may directly obtain the information from the first server. Therefore, the first device does not need to traverse the second server and the third server before obtaining the information from the second server or the third server. Therefore, signaling overheads can be reduced, and a service delay can be reduced.

204a: The first server sends a storage response to the second server.

In this embodiment, step 204a is an optional step. After the first server stores the information about the first instance, the first server may send the storage response to the second server, where the storage response is used to notify the second server that the first server has already stored the information about the first instance.

204b: The first server sends a storage response to the third server.

In this embodiment, step 204b is an optional step. After the first server stores the information about the second instance, the first server may send the storage response to the third server, where the storage response is used to notify the third server that the first server has already stored the information about the second instance.

It should be noted that there is no definite limitation on a time sequence of step 204a and step 204b. In other words, step 204a may be performed before step 204b, step 204a may be performed after step 204b, or step 204a and step 204b may be performed simultaneously. This is not specifically limited herein.

In this embodiment, the first server sends the storage response to the second server or the third server. This helps the second server and the third server determine storage statuses of the information about the first instance and the information about the second instance.

205: The first device sends the identification information of the application and location information of the first device to the first server.

In this embodiment, step 205 is an optional step. When the first device needs to obtain information about an application instance in the first server, the first device sends the identification information of the application and the location information of the first device to the first server. Then, the first server receives the identification information of the application and the location information of the first device from the first device. For descriptions of the identification information of the application, refer to step 201a. Details are not described herein again. The location information of the first device may be one or more of a TAI, a cell ID, a DNAI, administrative location information, geographical location information, or latitude and longitude information of a location of the first device.

206: The first server sends an IP address of a third instance to the first device.

In this embodiment, step 206 is an optional step, and the first server may return, to the first device, an IP address of an instance to be obtained by the first device. For ease of description, the instance to be obtained by the first device is referred to as the third instance, and the third instance is the first instance or the second instance. The third instance is determined based on the identification information of the application, the location information of the first device, the information about the first instance of the application, and the information about the second instance of the application. The first server determines that the application corresponding to the identification information of the application is the application corresponding to the first instance and the second instance. If the first server determines that the location information of the first device is the same as location information of the first instance, the first server determines that the third instance is the first instance. Alternatively, if the first server determines that a distance between a location indicated by the location information of the first device and a location indicated by the information about the first instance is smaller than a distance between the location indicated by the location information of the first device and a location indicated by the information about the second instance, the first server determines that the third instance is the first instance. During actual application, the first server may further determine the third instance in another manner. Details are not described herein again.

Optionally, the first server further sends other information about the third instance to the first device.

In an implementation, when the IP address of the third instance is the IP address of the first instance, the first server further sends one or more of the access identification information of the first edge network, the IP address of the first edge network, or the IP address of the first edge enabler server to the first device. In this implementation, the first server sends the access identification information of the first edge network or the IP address of the first edge network to the first device in addition to sending the IP address of the first instance to the first device, so that the first device determines a location of the first instance server corresponding to the information about the first instance. In addition, that the first server sends the IP address of the first edge enabler server to the first device may enable the first device to determine a location of the first edge enabler server in the edge network. Therefore, this helps the first device perform another operation based on the location of the first instance server or the location of the first edge enabler server.

In another implementation, when the IP address of the third instance is the IP address of the second instance, the first server further sends one or more of the access identification information of the second edge network, the IP address of the second edge network, or the IP address of the second edge enabler server to the first device. In this implementation, the first server sends the access identification information of the second edge network or the IP address of the second edge network to the first device in addition to sending the IP address of the second instance to the first device, so that the first device determines a location of the second instance server corresponding to the information about the second instance. In addition, that the first server sends the IP address of the second edge enabler server to the first device may enable the first device to determine a location of the second edge enabler server in the edge network. Therefore, this helps the first device perform another operation based on the location of the second instance server or the location of the second edge enabler server.

It should be further understood that, in this embodiment, a server that exchanges information with the first server is not limited to the foregoing second server and the foregoing third server, and there may be a server similar to the foregoing second server and the third server. For example, there may be a fourth server, configured to obtain information about the third instance of the application. In this case, for a process of exchanging information between the first server and the fourth server, refer to the foregoing method procedure between the first server and the second server or the third server. This is not specifically limited herein. In addition, it should be further understood that, in this embodiment, information exchange between the first server and the second server and between the first server and the third server is merely used as an example for description, and a quantity of servers exchanging information with the first server is not limited.

In this embodiment, it is proposed that the first server may determine, based on the identification information of the application and the location information of the first device that are sent by the first device, to determine the third instance in the first instance and the second instance. Therefore, when the first device needs to obtain an application instance, the first device does not need to sequentially search the second server and the third server for information about the application instance, but may directly obtain the information about the application instance from the first server. Therefore, a signaling procedure in which the first device obtains the information about the application instance can be reduced, and further a network delay caused by increasing signaling can be reduced. In addition, the first server may further select, for the first device based on a requirement of the first device, an application instance that satisfies the requirement of the first device. Therefore, a process in which the first device obtains the information about the application instance is optimized.

In this embodiment, the foregoing first server may be an edge network configuration server or another server. This is not specifically limited herein. The foregoing second server or the third server is any server or network element in an edge enabler server, a network management server in an edge network, an application instance server, an operation support system OSS network element, an application instance management network element, or an edge enabler server management network element. This is not specifically limited herein. The application instance management network element refers to a network element or a functional entity configured to manage the application instance, for example, a network element or a functional entity that packages software package resources (package) of the application instance and distributes the software package resources to a running environment of the edge network. The edge enabler server management network element is configured to manage the edge enabler server, for example, configure storage and computing resources for the edge enabler server, configure information about the edge network for the edge enabler server, and configure, for the edge enabler server, an application instance for which edge enabler service needs to be provided.

In addition, the second server and the third server may be a same type of servers. For example, both the second server and the third server may be edge enabler servers. Alternatively, the second server and the third server may be different types of servers. For example, the second server is the edge enabler server, and the third server is the network management server in the edge network. This is not specifically limited herein.

However, when the second server is the first instance server of the application, because the first instance server of the application stores the information about the first instance internally, the second server (namely, the first instance server of the application) does not perform step 201a, and may directly perform step 202a and subsequent steps. Similarly, when the third server is the second instance server of the application, the third server (namely, the second instance server of the application) does not perform step 201b, and may directly perform step 202b and subsequent steps.

In addition, when the second server or the third server is the network management server in the edge network or the operation support system network element, because the information about the application instance has already been configured in the network management server or the operation support system network element, the second server does not perform step 201a, and may directly perform step 202a and the subsequent steps. Similarly, the third server does not perform step 201b, and may directly perform step 202b and the subsequent steps.

Figure 3:
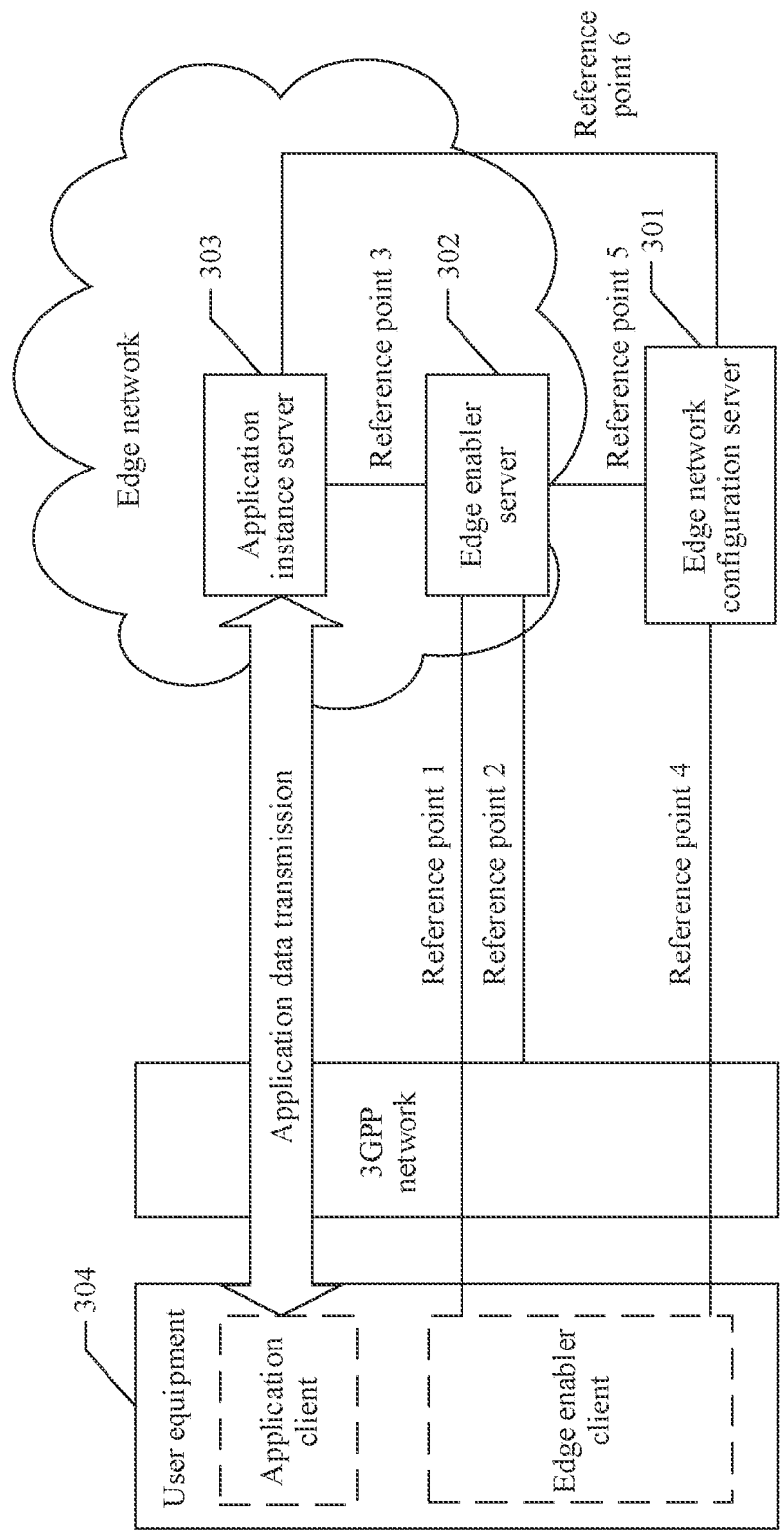
FIG. 3 is a diagram of another system architecture to which an information obtaining method is adapted according to an embodiment of this application.

For ease of further understanding, the following provides further descriptions in an implementation in which the first server is the edge network configuration server, the second server is the edge enabler server, and the first device is user equipment. Specifically, as shown in FIG. 3, a multi-access edge computing network architecture mainly includes an edge network configuration server 301, an edge enabler server 302, an application instance server 303, and user equipment 304.

The edge enabler server 302 may provide some enabler capabilities for an application instance, and can better support deployment of an application in MEC. The edge enabler server 302 is connected to the application instance server 303 by using a reference point 3 (edge-3). Therefore, the edge enabler server 302 may obtain information about an application instance in the application instance server 303 by using the reference point 3. In this case, the reference point 3 may be the fourth interface 114 in FIG. 1C or FIG. 1D, or may be the seventh interface 117 in FIG. 1D.

The edge network configuration server 301 is configured to obtain information about an application instance, for use by the user equipment 304. The edge network configuration server 301 is connected to the edge enabler server 302 by using a reference point 5 (edge-5). Therefore, the edge network configuration server 301 may obtain information about an application instance in the edge enabler server 302. In this case, the reference point 5 may be the first interface 111 in FIG. 1A, FIG. 1C, or FIG. 1D, or may be the fifth interface 115 in FIG. 1D. The edge network configuration server 301 is connected to the application instance server 303 by using a reference point 6 (edge-6). Therefore, the edge network configuration server 301 may obtain the information about the application instance in the application instance server 303. In this case, the reference point 6 may be the third interface 113 in FIG. 1C or FIG. 1D, or may be the sixth interface 116 in FIG. 1D. In addition, the edge network configuration server 301 is connected to the user equipment 304 by using a reference point 4 (edge-4). Therefore, the edge network configuration server 301 may send the information about the application instance to the user equipment 304. In this case, the reference point 4 may be the second interface 112 in FIG. 1A, FIG. 1C, or FIG. 1D.

In addition, both the edge enabler server 302 and the application instance server 303 are located in an edge network. The edge network EDN is a peer-to-peer concept of central cloud, may be understood as a local data center, and may be identified by using an edge network access identifier DNAI. A plurality of local edge networks (local data network, local DN) may be deployed in the edge network. There may be a plurality of edge enabler servers 302 and a plurality of application instance servers 303 in the edge network. This is not specifically limited herein.

The application instance server 303 is configured to serve an instance or several instances of the application. An application server corresponding to the application instance server 303 may also be referred to as an edge application (edge application) server, a mobile edge computing application (mobile edge computing application, MEC application), or a multi-access edge computing application (multi-access edge computing application, MEC application) server.

The user equipment 304 may be a mobile device such as a mobile phone or a computer. An application client (application client) and an edge enabler client (edge enabler client, EEC) may be installed on the user equipment 304. The application client is a peer entity of an edge application on a user side. The edge enabler client EEC is a peer entity of an edge enabler server EES on the user side.

In addition, the application client in the user equipment UE 304 and the application instance server 303 in the edge network may perform application data transmission (application data traffic), and a connection may be established between the edge enabler client EEC and the edge enabler server 302 by using a reference point 1 (edge-1). The edge enable server 302 is further connected to a 3GPP network by using a reference point 2 (edge-2).

Figure 4:
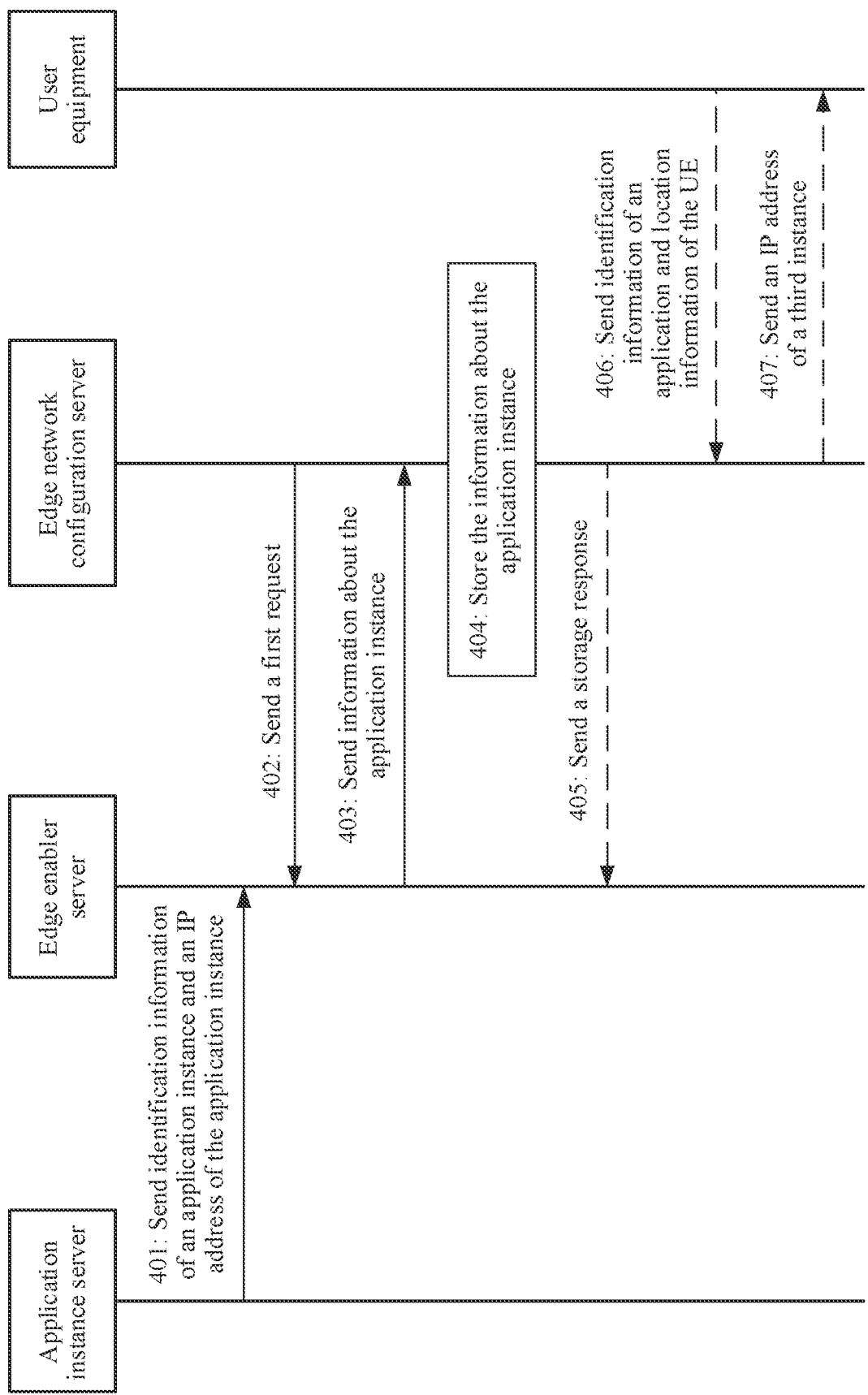
FIG. 4 is another flowchart of an information obtaining method according to an embodiment of this application.

Based on the system architecture shown in FIG. 3, the following describes a procedure performed when a message between the edge network configuration server and the edge enabler server is based on a request-response mechanism. Specifically, as shown in FIG. 4, the procedure includes the following steps.

401: The application instance server sends identification information of an application instance and an IP address of the application instance to the edge enabler server.

In this embodiment, the application instance server may manage one or more instances of an application. Therefore, the application instance server stores information about the application instance, for example, the identification information of the application instance and the IP address of the application instance. The identification information of the application instance is used to identify the application instance. The IP address of the application instance is used to indicate a deployment location of the instance in a network, and may be used by the application client to connect to the instance to obtain an application service of the instance. Therefore, the application instance server may send the identification information of the application instance and the IP address of the application instance to the edge enabler server. That is, the edge enabler server may receive the identification information of the application instance and the IP address of the application instance from the application instance server.

Specifically, the identification information of the application instance and the IP address of the application instance that are received by the edge enabler server from the application instance server may be carried in a message that is based on a request-response (request-response) mechanism. For example, the edge enabler server sends a request message to the application instance server, and the application instance server returns a response message to the edge enabler server, and the response message carries the identification information of the application instance and the IP address of the application instance. Alternatively, the identification information of the application instance and the IP address of the application instance that are received by the edge enabler server from the application instance server may be carried in a message that is based on a subscribe-notification (subscribe-notification) mechanism. For example, the edge enabler server sends a subscription message to the application instance server, the application instance server returns one or more notification messages that are based on the subscription message to the edge enabler server, and each notification message carries the identification information of the application instance and the IP address of the application instance.

Optionally, the application instance server may further send, to the edge enabler server, information for indicating a location of the application instance, for example, an internet protocol IP address of the application instance, access identification information of an edge network, an IP address of an edge network in which the edge enabler server is located, or an IP address of the edge enabler server. This is not specifically limited herein.

It should be further understood that there may be one or more application instance servers in step 401, and there may also be one or more edge enabler servers. When there are a plurality of application instance servers and there are a plurality of edge enabler servers, the application instance servers are in a one-to-one correspondence with the edge enabler servers, or each edge enabler server corresponds to a plurality of application instance servers. This is not specifically limited herein.

402: The edge network configuration server sends a first request to the edge enabler server.

In this embodiment, when the edge network configuration server has a requirement of obtaining information about an application instance, the edge network configuration server may send the first request to the edge enabler server. The first request is used to request the information about the application instance.

It should be understood that, in step 402, the edge network configuration server is usually a server serving the edge enabler server in the edge network, and there may be one or more edge enabler servers. This is not specifically limited herein.

403: The edge enabler server sends the information about the application instance to the edge network configuration server.

In this embodiment, after the edge enabler server receives the first request sent by the edge network configuration server, the edge enabler server sends the information about the application instance to the edge network configuration server. The information about the application instance includes the identification information of the application instance and the IP address of the application instance in step 401, and the information about the application instance may further include the access identification information of the edge network, the IP address of the edge network, or the IP address of the edge enabler server. In some implementations, the information about the application instance further includes identification information of the edge enabler server or service range information of the application instance. Specifically, refer to related descriptions in step 201*a*. Details are not described herein again.

It should be understood that the foregoing information such as the access identification information of the edge network, the IP address of the edge network, and the IP address of the edge enabler server may be obtained by the edge enabler server from the application instance server, or may be obtained by the edge enabler server from a local database of the edge enabler server. This is not specifically limited herein.

It should be understood that, in step 403, the information about the application instance may be information about different instances of a same application, for example, the information about the first instance and the information about the second instance in the foregoing embodiment corresponding to FIG. 2. During actual application, information about another instance of the application may further be included. This is not specifically limited herein.

404: The edge network configuration server stores the information about the application instance.

In this embodiment, when the edge network configuration server receives the information about the application instance sent by the edge enabler server, the edge network configuration server stores the information about the application instance. Specifically, each time the edge network configuration server receives the information about the application instance, the edge network configuration server stores the information about the application instance once. The information about the application instance stored each time may differ. This is not specifically limited herein.

Optionally, when the information about the application instance sent by the edge enabler server does not include a tracking area identity TAI of the UE, or the information about the application instance does not include a cell ID or a cell ID list, the edge network configuration server may further parse an DNAI/an EDN IP to obtain the tracking area identity TAI of the UE, the cell ID, the cell ID list, or the like, and store the tracking area identity TAI of the UE, the cell ID, or the cell ID. Specifically, the edge network configuration server may send the DNAI to a 3GPP network element, to obtain information such as the tracking area identity TAI, the cell ID, or the cell ID list corresponding to the DNAI. The 3GPP network element may be a unified data repository (unified data repository, UDR) network element or a session management function (session management function, SMF) network element. This is not specifically limited herein. After the edge network configuration server may send the DNAI to the 3GPP network element, the edge network configuration server retrieves, in the UDR or the SMF, the information such as the tracking area identity TAI, the cell ID, or the cell ID list corresponding to the DNAI, and send the information such as the tracking area identity TAI, the cell ID, or the cell ID list to the edge network configuration server.

The service range information of the first instance may be a tracking area identity (tracking area identity, TAI) of the first device, may be identification information of a cell in which the first device is located, for example, a cell ID (cell ID) or a cell list (cell ID list), or may be other information used to identify a location of a served user of the first instance. This is not specifically limited herein.

405: The edge network configuration server sends a storage response to the edge enabler server.

In this embodiment, step 405 is an optional step. After the edge network configuration server stores the information about the application instance sent by the edge enabler server, the edge network configuration server may send the storage response to the edge enabler server, to notify the edge enabler server that the edge network configuration server has successfully stored the information about the application instance. Optionally, the edge network configuration server may send the storage response to the edge enabler server once each time the edge network configuration server stores the information about the application instance.

406: The user equipment UE sends identification information of the application and location information of the UE to the edge network configuration server.

In this embodiment, step 406 is an optional step. When the user equipment UE needs to obtain information about an application instance in the edge network configuration server, the UE sends the identification information of the application and the location information of the UE to the edge network configuration server. Then, the edge network configuration server receives the identification information of the application and the location information of the UE from the UE. For descriptions of the identification information of the application and the location information of the UE, refer to step 201*a*. Details are not described herein again.

407: The edge network configuration server sends an IP address of a third instance to the user equipment UE.

In this embodiment, step 407 is an optional step, and the edge network configuration server may return, to the UE, an IP address of an instance to be obtained by the UE. For ease of description, the instance to be obtained by the UE is referred to as the third instance. The third instance is one of a plurality of instances of the application. For example, the third instance may be the first instance or the second instance in the foregoing embodiment corresponding to FIG. 2. In this case, the third instance is determined based on the identification information of the application, the location information of the UE, the information about the first instance of the application, and the information about the second instance of the application.

Optionally, the edge network configuration server further sends other information about the third instance to the UE. Specifically, this is similar to step 206. Details are not described herein again. Optionally, the method shown in FIG. 4 further includes the following steps. The edge network configuration server (edge configuration server, ECS) obtains area information of the EES, and obtains the location information of the user equipment, and then the ECS determines a target EES based on the area information of the EES and the location information of the user equipment. For example, the EES is one or more EESs managed by the ECS. The target EES is an EES that matches a location of the user equipment in the foregoing EESs. Therefore, the ECS may select, for the user equipment by obtaining the area information of the EES and the location information of the user equipment, a target EES that matches the location of the user equipment or is closest to the user equipment, that is, select an EDN in which the target EES is located. When the user equipment requests the EES to discover an application instance, it may be ensured that the application instance accessed by the user equipment is an application instance that matches the location of the user equipment or is closest to the user equipment. In this way, user experience is improved, and a transmission delay is reduced. For an implementation of this step, refer to descriptions in FIG. 13 and FIG. 14.

In this embodiment, the edge network configuration server that manages information about an application instance may receive the information about the application instance from the edge enabler server, and store the obtained information about the application instance in the edge network configuration server. Therefore, a problem of storing information about an application instance in an edge network is resolved. In addition, signaling exchange between the edge network configuration server and the edge enabler server is based on a request-response mechanism, the edge network configuration server sends the first request to the edge enabler server when the edge network configuration server needs to obtain the information about the application instance, and the edge enabler server may also send the information about the application instance to the edge network configuration server based on the first request. Therefore, a requirement of the edge network configuration server to obtain the application instance can be satisfied, to further implement a function of the edge network configuration server to store the information about the application instance. In addition, according to the method, the UE can obtain the information about the application instance from the edge network configuration server, and does not need to obtain the information about the application instance from a plurality of edge enabler servers or another server. Therefore, signaling overheads generated when the UE obtains the information about the application instance can be reduced, and an application access delay can be reduced.

Figure 5:
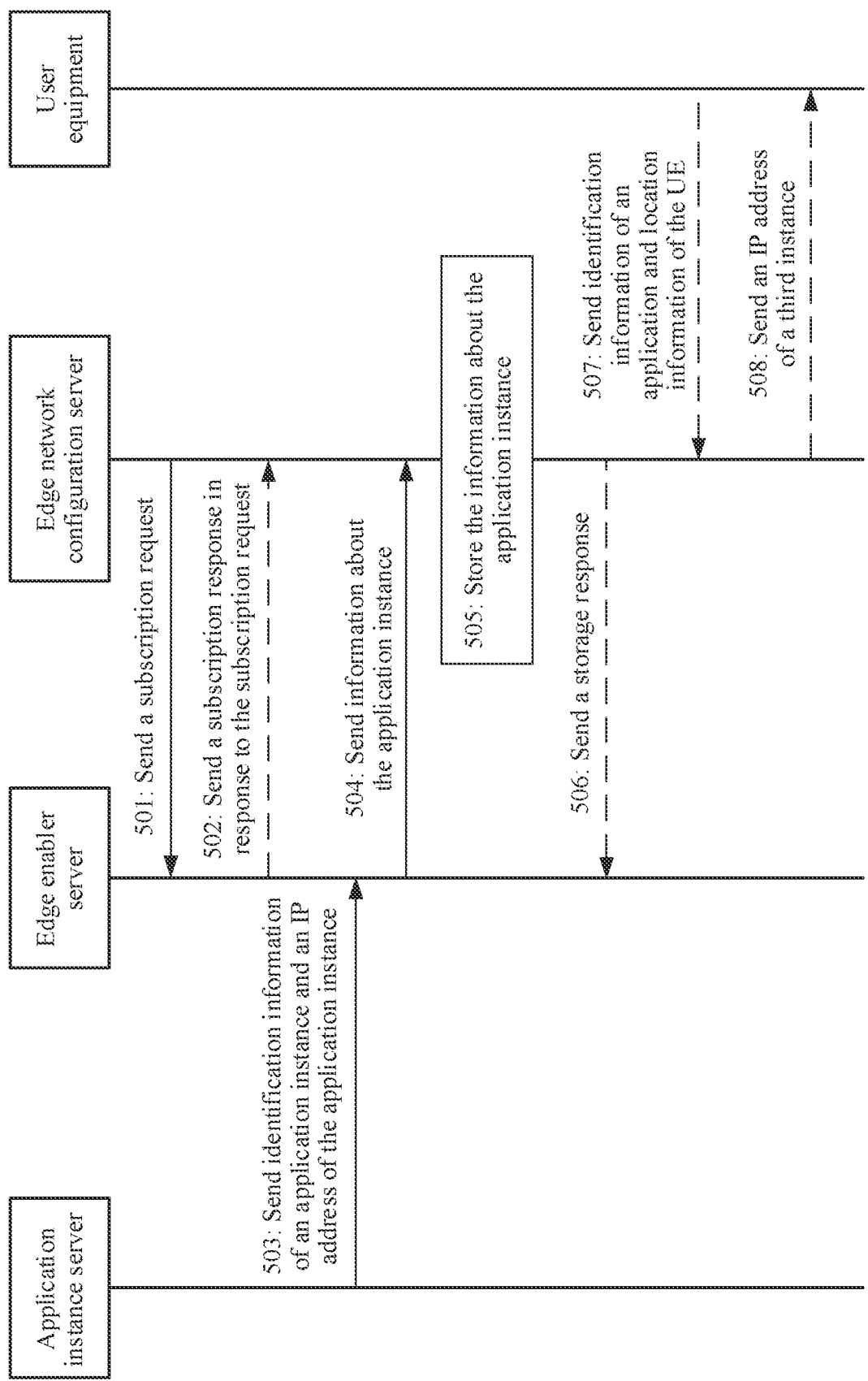
FIG. 5 is another flowchart of an information obtaining method according to an embodiment of this application.

Based on the system architecture shown in FIG. 3, the following describes a procedure performed when a message between the edge network configuration server and the edge enabler server is based on a subscribe-notification mechanism. Specifically, as shown in FIG. 5, the procedure includes the following steps.

501: The edge network configuration server sends a subscription request to the edge enabler server.

In this embodiment, before the edge network configuration server needs to obtain information about one or more application instances, the edge network configuration server may first send the subscription request to the edge enabler server, where the subscription request is used to request to subscribe to information about an application instance in the edge enabler server, so that when the information about the application instance in the edge enabler server is updated, the edge enabler server can actively notify the edge network configuration server of the information about the application instance. It should be understood that updating in this embodiment may mean that the information about the application instance appears in the edge enabler server for the first time, may mean that the information about the application instance in the edge enable server does not increase or decrease but changes, or may mean that all or some of the information about the application instance is deleted from the edge enabler server or invalidated. Specifically, this is similar to the foregoing case in which the information about the application instance in the second server is updated. Details are not described herein again.

Optionally, the subscription request includes a subscription condition, and the subscription condition is used to indicate the application instance. Specifically, the application instance may be one instance of an application or several instances of the application. For example, the application instances may be the first instance and the second instance in the embodiment corresponding to FIG. 2. Optionally, the application instances may further include an instance other than the first instance and the second instance. This is not specifically limited herein.

It should be understood that there may be one or more edge enabler servers in step 501. Therefore, the edge network configuration server may subscribe to information about a plurality of different instances from a plurality of edge enabler servers.

502: The edge enabler server sends a subscription response in response to the subscription request to the edge network configuration server.

In this embodiment, step 502 is an optional step, and the subscription response is used to notify the edge network configuration server whether subscription succeeds. When the edge network configuration server successfully subscribes to the information about the application instance in the edge enabler server, the edge enabler server notifies the edge network configuration server by sending a notification message to the edge network configuration server. It should be understood that because there may be a plurality of edge enabler servers, step 502 may be performed for a plurality of times, that is, different edge enabler servers send subscription responses to the edge network configuration server.

503: The application instance server sends identification information of an application instance and an IP address of the application instance to the edge enabler server.

In this embodiment, there may be one or more application instance servers in step 503, and there may also be one or more edge enabler servers. When there are a plurality of application instance servers and there are a plurality of edge enabler servers, the application instance servers are in a one-to-one correspondence with the edge enabler servers, or each edge enabler server corresponds to a plurality of application instance servers. This is not specifically limited herein.

It should be further understood that there is no definite limitation on a time sequence of step 503, step 501, and step 502. In other words, step 503 may be performed before step 501 and step 502. Alternatively, step 503 may be performed before step 501 and after step 502. Alternatively, step 503 is performed after step 501 and step 502. Alternatively, step 503 and step 501 are performed simultaneously. Alternatively, step 503 and step 502 are performed simultaneously. This is not specifically limited herein.

Specifically, step 503 is similar to step 401. Details are not described herein again.

504: The edge enabler server sends the information about the application instance to the edge network configuration server.

In this embodiment, after the edge enabler server receives the identification information of the application instance and the IP address of the application instance that are sent by the application instance server, the edge enabler server sends the information about the application instance to the edge network configuration server. The information about the application instance includes the identification information of the application instance and the IP address of the application instance in step 503, and the information about the application instance further includes access identification information of an edge network, an IP address of the edge network, or an IP address of the edge enabler server. In some implementations, the information about the application instance further includes identification information of the edge enabler server or service range information of the application instance. Specifically, refer to related descriptions in step 201a. Details are not described herein again.

It should be understood that the foregoing information such as the access identification information of the edge network, the IP address of the edge network, and the IP address of the edge enabler server may be obtained by the edge enabler server from the application instance server, or may be obtained by the edge enabler server from a local database of the edge enabler server. This is not specifically limited herein.

It should be understood that, in step 504, the information about the application instance may be information about different instances of a same application, for example, the information about the first instance and the information about the second instance in the foregoing embodiment corresponding to FIG. 2. During actual application, information about another instance of the application may further be included. This is not specifically limited herein.

505: The edge network configuration server stores the information about the application instance.

506: The edge network configuration server sends a storage response to the edge enabler server.

507: The user equipment UE sends identification information of the application and location information of the user equipment UE to the edge network configuration server.

508: The edge network configuration server sends an IP address of a third instance to the user equipment UE.

In this embodiment, step 505 to step 508 are similar to step 404 to step 407. Details are not described herein again.

In this embodiment, the edge network configuration server that manages information about an application instance may receive the information about the application instance from the edge enabler server, and store the obtained information about the application instance in the edge network configuration server. Therefore, a problem of storing information about an application instance in an edge network is resolved. In addition, because signaling exchange between the edge network configuration server and the edge enabler server is based on the subscribe-notification mechanism, when the edge network configuration server subscribes to one instance of the application or several instances of the application from the edge enabler server, the edge enabler server may send the information about the application instance to the edge network configuration server when the information about the application instance is updated. Therefore, a requirement of the edge network configuration server to obtain the application instance can be satisfied, to further implement a function of the edge network configuration server to store the information about the application instance. In addition, according to the method, the UE can obtain the information about the application instance from the edge network configuration server, and does not need to obtain the information about the application instance from a plurality of edge enabler servers or another server. Therefore, signaling overheads generated when the UE obtains the information about the application instance can be reduced, and an application access delay can be reduced.

The information obtaining method provided in the embodiments of this application may further be combined with a common API framework (common application programming interface framework, common API framework, CAPIF) in addition to being applicable to the foregoing system shown in FIG. 3, and some signaling procedures in the common API framework are reused to reduce signaling construction between the edge network configuration server and the edge enabler server.

Figure 6A:
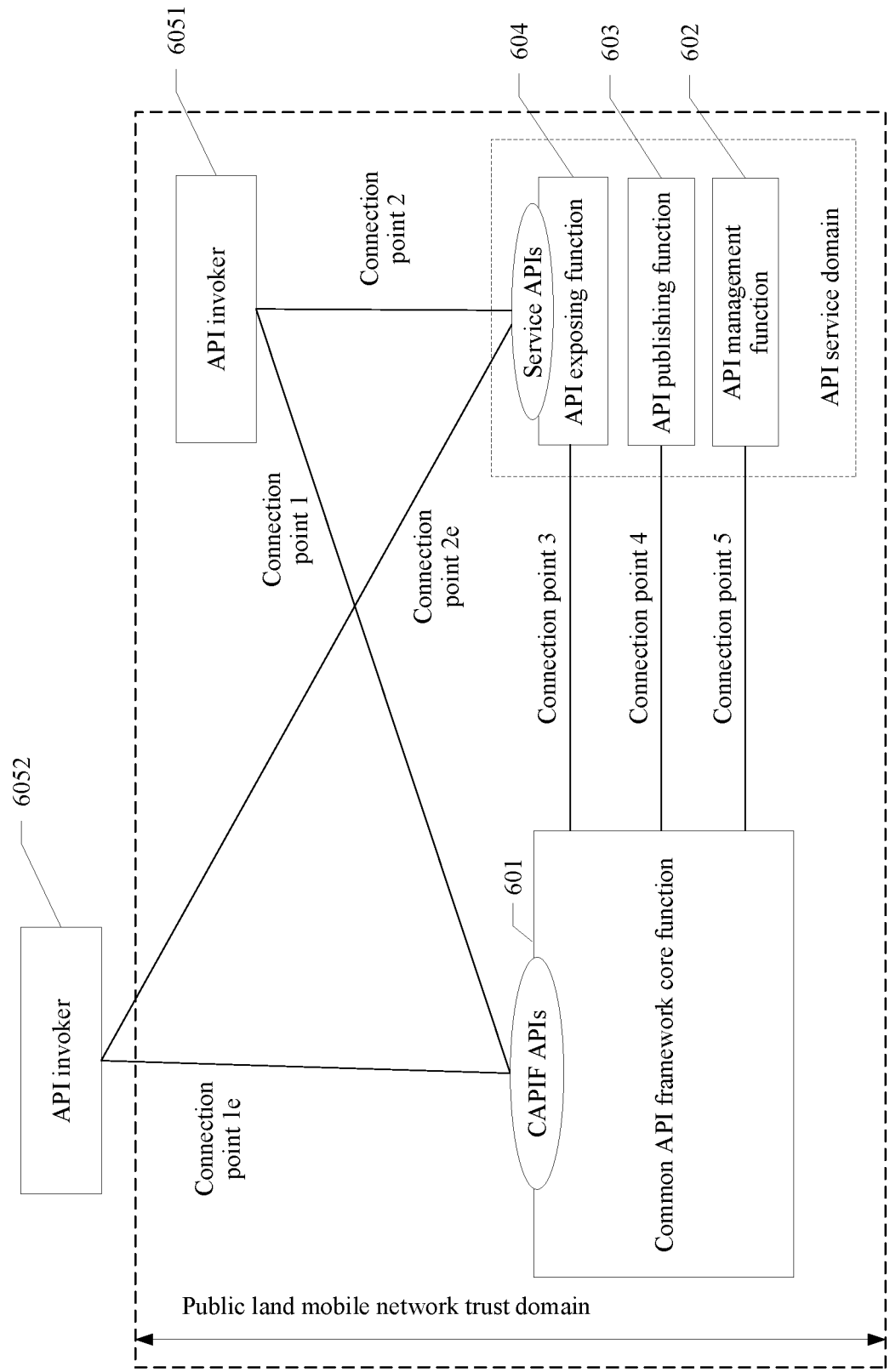
FIG. 6A is a diagram of another system architecture to which an information obtaining method is adapted according to an embodiment of this application.

The following first describes the common API framework. Specifically, as shown in FIG. 6A, the common API framework includes:

a common API framework core function (CAPIF core function, CCF) 601, an API management function (application programming interface management function, API management function, AMF) 602, an API publishing function (application programming interface publishing function, API publishing function, APF) 603, an API exposing function (application programming interface exposing function, API exposing function, AEF) 604, and an API invoker (application programming interface invoker, API invoker) 6051/6052.

The common API framework core function CCF 601, the API management function AMF 602, the API publishing function APF 603, the API exposing function AEF 604, and the API invoker 6051 are located in a public land mobile network trust domain (public land mobile network trust domain, PLMN trust domain). The API invoker 6052 is located outside the public land mobile network trust domain.

The common API framework core function CCF 601 is connected to the API exposing function AEF 604 by using a connection point 3 (CAPIF-3), the common API framework core function CCF 601 is connected to the API publishing function APF 603 by using a connection point 4 (CAPIF-4), and the common API framework core function CCF 601 is connected to the API exposing function AMF 602 by using a connection point 5 (CAPIF-5). The API exposing function AEF 604, the API publishing function APF 603, and the API exposing function AMF 602 all belong to a same API provider domain.

In addition, the common API framework core function CCF 601 is connected to the API invoker 6051 by using a connection point 1 (CAPIF-1), and the API invoker 6051 is connected to service APIs in an API service domain by using a connection point 2 (CAPIF-2). For the API invoker 6052 located outside the public land mobile network trust domain, the common API framework core function CCF 601 is connected to the API invoker 6052 by using a connection point 1e (CAPIF-1e), and the API invoker 6052 invokes the service APIs in the API service domain by using a connection point 2e (CAPIF-2e).

Specifically, functions of the modules in FIG. 6A are as follows.

The API invoker 6051/6052 is also referred to as an API invoker, and refers to a third-party application that has signed a service agreement with a public land mobile network (public land mobile network, PLMN) operator, for example, an end-to-end (machine to machine, M2M) application, an internet of things (internet of things, IoT) application, or a vehicle to everything (vehicle to everything, V2X) application. This is not specifically limited herein. It should be understood that the foregoing application may run in a terminal device, or may run in a network device. In addition, the API invoker 6051/6052 may alternatively be a device in a PLMN network, for example, a mobility management entity (mobility management entity, MME), a radio access network (radio access network, RAN) device, a policy and charging rules function (policy and charging rules function, PCRF) network element, and the like in a 4G communication system; or may be an access and mobility management function (access and mobility management function, AMF) network element, a session management function (session management function, SMF) network element, a user plane function (user plane function, UPF) network element, a policy control function (policy control function, PCF) network element, an application function (application function, AF) network element, and the like in a 5G communication system. The API invoker 6051/6052 may support authentication of an API invoker, may support mutual authentication with the common API framework core function CCF 601, may access authorization obtained by an API, may discover the APIs, and may invoke the APIs.

The common API framework core function CCF 601 may authenticate the API invoker based on an identity of the API invoker and other information; may release, store, and support API discovery; may be responsible for API access control based on a policy of the PLMN operator; may store a log invoked by the API, and provide the log to an authorized entity for accessibility; may support registering of the API invoker; and may further store a configuration policy.

The API management function AMF 602 is configured to provide API management. Specifically, the API management function AMF 602 may audit the log invoked by the API and provided by the common API framework core function CCF 601, may monitor an event reported by the common API framework core function CCF 601, may configure a policy of an API provider for the API, may detect a status of the API, and may register the API invoker.

The API publishing function APF 603 is configured to provide an API publishing function, so that the API invoker can discover the API.

The API exposing function AEF 604 is configured to provide the APIs and an entry for the API invoker 6051/6052 to invoke the API. Specifically, the API exposing function AEF 604 may authenticate the API invoker 6051/6052 based on an identity of the API invoker 6051/6052 and other information provided by the common API framework core function CCF 601, may confirm authorization provided by the common API framework core function CCF 601, and may synchronize an API log to the common API framework core function CCF 601.

It should be understood that the foregoing system architecture shown in FIG. 6A may be further extended, so that different common API framework core functions CCFs can interwork with each other. For example, when two common API framework core functions CCFs are located in a same trust domain, the foregoing system architecture in FIG. 6A may be extended to that in FIG. 6B. When two common API framework core functions CCFs are located in different trust domains, the foregoing system architecture in FIG. 6A may be extended to that in FIG. 6C. For units or modules in FIG. 6B and FIG. 6C, refer to the foregoing descriptions corresponding to FIG. 6A. Details are not described herein again. It should be further understood that, in FIG. 6B, a common API framework core function CCF 1 and a common API framework core function CCF 2 may interact with each other by using a connection point 6 (CAPIF-6). In FIG. 6C, a common API framework core function CCF 1 and a common API framework core function CCF 2 may further interact with each other by using a connection point 6e (CAPIF-6e). The connection point 6 or the connection point 6e may support one common API framework core function CCF in publishing a service API to another common API framework core function CCF or in requesting the another common API framework core function CCF to discover the service API. It should be further understood that, during actual application, FIG. 6A may be further extended to adapt to requirements of different scenarios. Details are not described herein again.

Figure 6B:
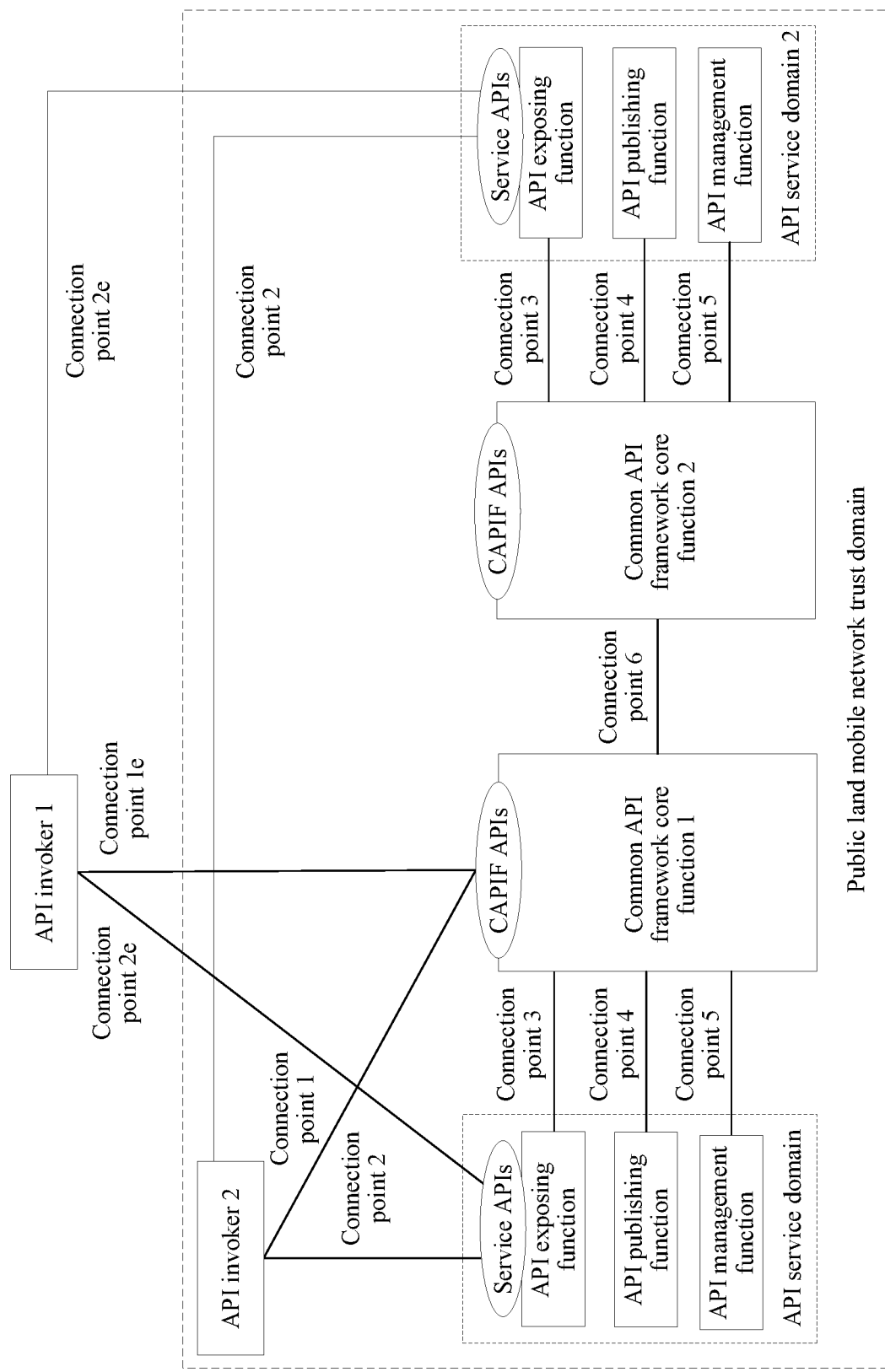
FIG. 6B is a diagram of another system architecture to which an information obtaining method is adapted according to an embodiment of this application.
Figure 6C:
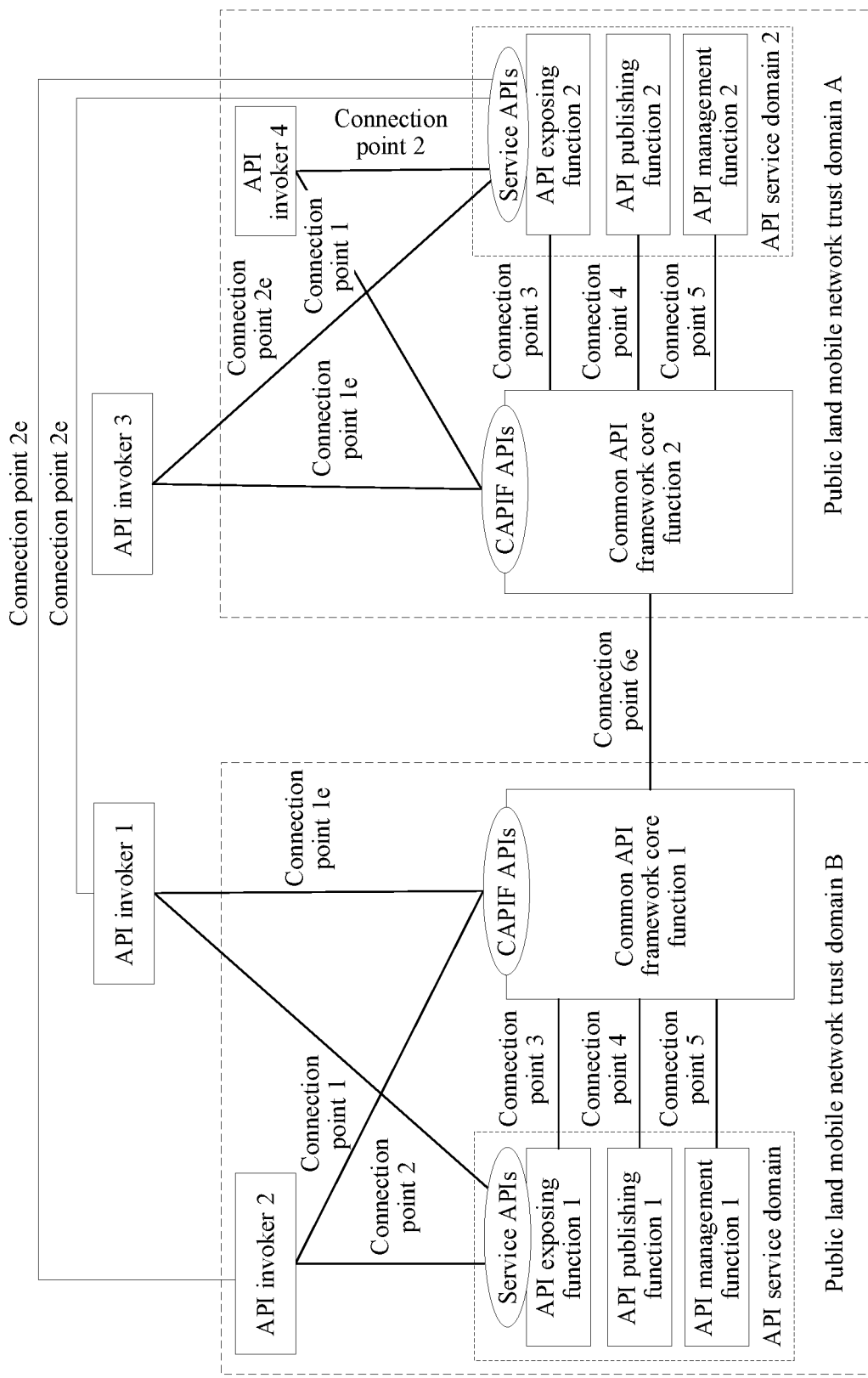
FIG. 6C is a diagram of another system architecture to which an information obtaining method is adapted according to an embodiment of this application.
Figure 7:
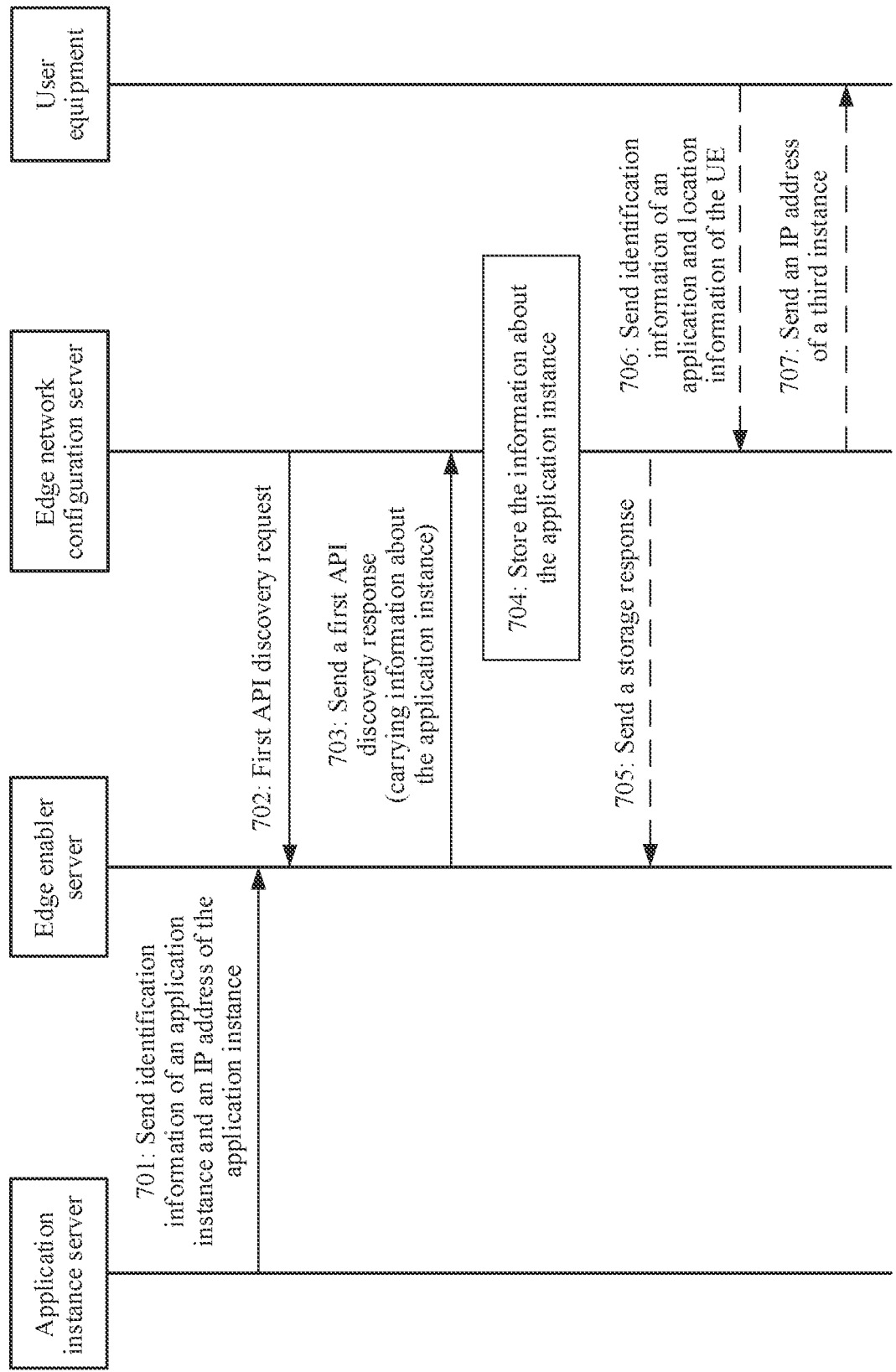
FIG. 7 is another flowchart of an information obtaining method according to an embodiment of this application.

With reference to the common API framework shown in FIG. 6A or the extended architecture shown in FIG. 6B or FIG. 6C, when some procedures in the information obtaining method reuse a CAPIF discovery (discover) mechanism, as shown in FIG. 7, the edge network configuration server and the edge enabler server perform the following steps.

In this embodiment, when the CAPIF discovery mechanism is reused, the edge network configuration server may implement a function of the common API framework core function 1 in FIG. 6B or FIG. 6C, the edge enabler server may implement a function of the common API framework core function 2 in FIG. 6B or FIG. 6C, and the application instance server may implement functions of one or more function modules in an API provider domain 2 in FIG. 6B or FIG. 6C, for example, the application instance server implements an API publishing function. In this case, an interface between the edge enabler server and the edge network configuration server includes some or all interface functions of the connection point 6 or the connection point 6e. For example, the foregoing reference point 5 in FIG. 3 may include the some or all interface functions of the connection point 6 or the connection point 6e; for example, the foregoing first interface 111 in FIG. 1A, FIG. 1C, or FIG. 1D may include the some or all interface functions of the connection point 6 or the connection point 6e.

701: The application instance server sends identification information of an application instance and an IP address of the application instance to the edge enabler server.

In this embodiment, because the application instance server may implement the functions of the one or more function modules in the API service domain 2 in FIG. 6B or FIG. 6C, the application instance server may send the identification information of the application instance and the IP address of the application instance to the edge enabler server by using different interfaces. For example, when the application instance server implements the API publishing function, the application instance server sends the identification information of the application instance and the IP address of the application instance to the edge enabler server by using the connection point 4. In this case, an interface between the edge enabler server and the application instance server includes some or all interface functions of the connection point 4. For example, the foregoing reference point 3 in FIG. 3 may include some or all interface functions of the connection point 4; for example, the foregoing fourth interface 114 in FIG. 1C or FIG. 1D may include the some or all interface functions of the connection point 4; for example, the foregoing seventh interface 117 in FIG. 1D may include the some or all interface functions of the connection point 4. In addition, when the application instance server implements an API exposing function, the application instance server sends the identification information of the application instance and the IP address of the application instance to the edge enabler server by using the connection point 3. When the application instance server implements an API management function, the application instance server sends the identification information of the application instance and the IP address of the application instance to the edge enabler server by using the connection point 5. This is not specifically limited herein.

702: The edge network configuration server sends a first API discovery request to the edge enabler server.

In this embodiment, the edge network configuration server sends the first API discovery request (service API publish request) to the edge enabler server by using the connection point 6 or the connection point 6e, where the first API discovery request is used to request to discover an application instance or an API. Optionally, the first API discovery request includes discovery type information, where the discovery type information is used to indicate that the first API discovery request is used to request the application instance, or the discovery type information is used to indicate that the first API discovery request is used to request the application instance and the API. The application instance may be one instance of an application or a plurality of instances of the application. For example, the application instances may be the first instance and the second instance in the foregoing embodiment corresponding to FIG. 2. It should be understood that, after the edge enabler server receives the first API discovery request, the edge enabler server may determine, by using the discovery type information carried in the edge enabler server, a type that needs to be discovered by the edge network configuration server. Optionally, the discovery type information may be represented by an Arabic numeral or a character string. For example, when the discovery type information is "0", it indicates that the first API discovery request is used to request to discover the API; when the discovery type information is "1", it indicates that the first API discovery request is used to request to discover the application instance, when the discovery type information is "2", it indicates that the first API discovery request is used to request to discover the application instance and the API. This is not specifically limited herein.

703: The edge enabler server sends a first API discovery response to the edge network configuration server, where the first API discovery response carries information about the application instance.

In this embodiment, after the edge network configuration server receives the first API discovery request sent by the edge enabler server, the edge network configuration server sends the first API discovery response (service API publish response) to the edge enabler server by using the connection point 6 or the connection point 6e. Specifically, when the first API discovery request is used to request to discover the application instance or the discovery type information in the first API discovery request is used to indicate that the first API discovery request is used to request the application instance, the edge network configuration server sends the first API discovery response to the edge enabler server, where the first API discovery response carries the information about the application instance.

The information about the application instance may include the identification information of the application instance and the IP address of the application instance in step 701, and the information about the application instance further includes access identification information of an edge network, an IP address of the edge network, or an IP address of the edge enabler server. In some implementations, the information about the application instance further includes identification information of the edge enabler server or service range information of the application instance. Specifically, refer to related descriptions in step 201a. Details are not described herein again.

704: The edge network configuration server stores the information about the application instance.

In this embodiment, the edge network configuration server may store the information about the application instance carried in the first API discovery response sent by the edge enabler server. In this case, the edge network configuration server may implement a function of the common API framework core function CCF 1 in FIG. 6B or FIG. 6A. Therefore, the common API framework core function CCF 1 may store the information about the application instance. In addition, the common API framework core function CCF 1 is connected to the API invoker by using the connection point 1 or the connection point 1e, and the UE may implement a function of the API invoker. Therefore, the edge network configuration server may provide the information about the application instance for the UE to use. That is, the common API framework core function CCF 1 may provide the information about the application instance for the API invoker to use. Therefore, the UE may directly obtain the information about the application instance from the edge network configuration server, that is, the UE may directly obtain the information about the application instance from the common API framework core function CCF 1, and does not need to traverse the edge enabler server (namely, the common API framework core function 2) to obtain the information about the application instance. Therefore, signaling overheads generated when the UE obtains the information about the application instance can be reduced, and an application access delay can be reduced.

705: The edge network configuration server sends a storage response to the edge enabler server.

In this embodiment, step 705 is an optional step. After the edge network configuration server stores the information about the application instance, the edge network configuration server sends the storage response to the edge enabler server, to notify the edge enabler server that the information about the application instance is stored successfully.

706: The UE sends identification information of the application and location information of the UE to the edge network configuration server.

In this embodiment, step 706 is an optional step. When the UE needs the information about the application instance, the UE sends the identification information of the application and the location information of the UE to the edge network configuration server. For example, when the UE implements a function of the API invoker 1 in FIG. 6B or FIG. 6C, the UE may send the identification information of the application and the location information of the UE to the edge network configuration server by using the connection point 1e.

707: The edge network configuration server sends an IP address of a third instance to the UE.

In this embodiment, step 707 is an optional step. The edge network configuration server may determine the third instance based on the identification information of the application and the location information of the UE that are sent by the UE and other information of the UE, and send the IP address of the third instance to the UE.

Optionally, the edge network configuration server further sends other information about the third instance to the UE, for example, one or more of access identification information of a first edge network, the IP address of the edge network, or the IP address of the edge enabler server. This is not specifically limited herein.

Specifically, refer to related descriptions in step 205. Details are not described herein again.

In this embodiment, because the CAPIF discovery mechanism may be reused between the edge network configuration server and the edge enabler server, both the edge network configuration server and the edge enabler server can implement common API framework core functions, the information about the application instance in the edge enabler server is sent to the edge network configuration server by using the connection point 6, and the obtained information about the application instance is stored in the edge network configuration server. Therefore, it is convenient for the edge network configuration server to send the information about the application instance to the UE. Therefore, not only is a problem of storing the information about the application instance in the edge network resolved, but also signaling in the CAPIF is reused, so that signaling overheads are reduced.

Figure 8:
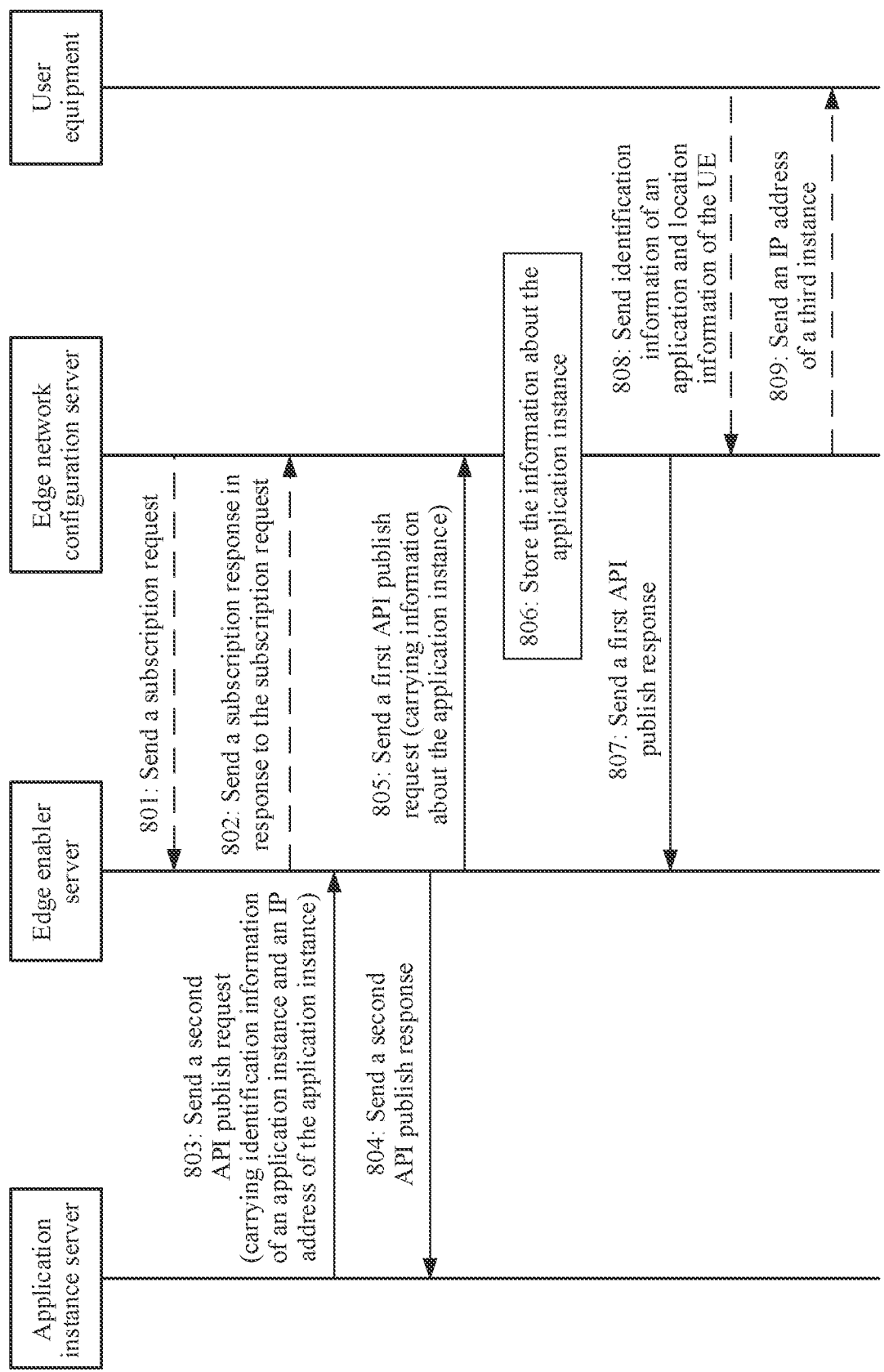
FIG. 8 is another flowchart of an information obtaining method according to an embodiment of this application.

With reference to the common API framework shown in FIG. 6A or the extended architecture shown in FIG. 6B or FIG. 6C, when some procedures in the information obtaining method reuse a CAPIF publish (publish) mechanism, as shown in FIG. 8, the edge network configuration server and the edge enabler server perform the following steps.

In this embodiment, when the CAPIF publish mechanism is reused, the edge network configuration server may implement a function of the common API framework core function 1 in FIG. 6B or FIG. 6C, the edge enabler server may implement a function of the common API framework core function 2 in FIG. 6B or FIG. 6C, and the application instance server may implement functions of one or more function modules in an API service domain 2 in FIG. 6B or FIG. 6C, for example, the application instance server implements an API publishing function. In this case, an interface between the edge enabler server and the edge network configuration server includes some or all interface functions of the connection point 6 or the connection point 6e. For example, the foregoing reference point 5 in FIG. 3 may include the some or all interface functions of the connection point 6 or the connection point 6e; for example, the foregoing first interface 111 in FIG. 1A, FIG. 1C, or FIG. 1D may include the some or all interface functions of the connection point 6 or the connection point 6e.

801: The edge network configuration server sends a subscription request to the edge enabler server.

In this embodiment, step 801 is an optional step. The edge network configuration server may send the subscription request to the edge enabler server, where the subscription request is used to request to subscribe to information about application instance, so that when the information about the application instance in the edge enabler server is updated, the edge network configuration server may notify the edge enabler server of the information about the application instance. It should be understood that updating in this embodiment may mean that the information about the application instance appears in the edge enabler server for the first time, may mean that the information about the application instance in the edge enable server does not increase or decrease but changes, or may mean that all or some of the information about the application instance is deleted from the edge enabler server or invalidated. Specifically, this is similar to the foregoing case in which the information about the application instance in the second server is updated. Details are not described herein again.

Optionally, the subscription request includes a subscription condition, the subscription condition is used to indicate the application instance, and the application instance may be one instance of an application or several instances of the application. For example, the application instance may be the first instance and the second instance in the foregoing embodiment corresponding to FIG. 2.

802: The edge enabler server sends a subscription response in response to the subscription request to the edge network configuration server.

In this embodiment, step 802 is an optional step. After the edge enabler server receives the subscription request sent by the edge network configuration server, the edge enabler server sends the subscription response to the edge network configuration server, where the subscription response may be used to notify the edge network configuration server whether current subscription is successful. In another implementation, the edge enabler server sends the subscription response to the edge network configuration server only after subscription succeeds. In this case, the subscription response is used to indicate to notify the edge network configuration server that the current subscription succeeds.

803: The application instance server sends a third API publish request to the edge enabler server, where the third API publish request carries identification information of the application instance and an IP address of the application instance.

In this embodiment, because the application instance server may implement the functions of the one or more function modules in the API service domain 2 in FIG. 6B or FIG. 6C, the application instance server may send the identification information of the application instance and the IP address of the application instance to the edge enabler server by using different interfaces. For example, when the application instance server implements the API publishing function, the application instance server sends the identification information of the application instance and the IP address of the application instance to the edge enabler server by using the connection point 4. In this case, an interface between the edge enabler server and the application instance server includes some or all interface functions of the connection point 4. For example, the foregoing reference point 3 in FIG. 3 may include some or all interface functions of the connection point 4; for example, the foregoing fourth interface 114 in FIG. 1C or FIG. 1D may include the some or all interface functions of the connection point 4; for example, the foregoing seventh interface 117 in FIG. 1D may include the some or all interface functions of the connection point 4. In addition, when the application instance server implements an API exposing function, the application instance server sends the identification information of the application instance and the IP address of the application instance to the edge enabler server by using the connection point 3. When the application instance server implements an API management function, the application instance server sends the identification information of the application instance and the IP address of the application instance to the edge enabler server by using the connection point 5. This is not specifically limited herein.

In this embodiment, an example in which the application instance server implements the API publishing function is used for description. In this case, the application instance server sends the third API publish request (service API publish request) to the edge enabler server by using the connection point 4, where the third API publish request carries the identification information of the application instance and the IP address of the application instance. Specifically, the identification information of the application instance and the IP address of the application instance are similar to those of the foregoing step 701. Details are not described herein again.

Optionally, when the third API publish request is used to publish an API and the application instance, the third API publish request may further carry information about the API, for example, a name of the API, a type of the API, a version number of the API, a communication type of the API, interface information (an IP address and a port number) of the API, protocol information, and the like.

804: The edge enabler server sends a third API publish response to the application instance server.

In this embodiment, step 804 is an optional step.

After the edge enabler server receives the third API publish request sent by the application instance server, the edge enabler server may send the third API publish response (service API publish response) to the application instance server. Optionally, the third API publish response may indicate whether the API is successfully published.

805: The edge enabler server sends a first API publish request to the edge network configuration server, where the first API publish request carries the information about the application instance.

In this embodiment, because the edge network configuration server may implement the function of the common API framework core function 1 in FIG. 6B or FIG. 6C, and the edge enabler server may implement the function of the common API framework core function 2 in FIG. 6B or FIG. 6C, after the foregoing API publishing function (the application instance server) publishes the API to the common API framework core function 2 (the edge enabler server), the common API framework core function 2 (the edge enabler server) may share the published API with the common API framework core function 1 (the edge network configuration server). Therefore, the edge enabler server may send the first API publish request (interconnection service API publish request) to the edge network configuration server by using the connection point 6, where the first API publish request is used to publish the API and/or the application instance. Specifically, the first API publish request is used to publish the application instance, or the first API publish request is used to publish the API and the application instance.

When the first API publish request is used to publish the application instance, the first API publish request carries the information about the application instance. Optionally, the first API publish request further includes publish type information, and the publish type information is used to indicate to publish the application instance.

When the first API publish request is used to publish the application instance and the API, the first API publish request carries the information about the application instance and the information about the API. Optionally, the first API publish request further includes publish type information, and the publish type information is used to indicate to publish the application instance and the API.

The information about the application instance may include the identification information of the application instance and the IP address of the application instance in step 803, and the information about the application instance further includes access identification information of an edge network, an IP address of the edge network, or an IP address of the edge enabler server. In some implementations, the information about the application instance further includes identification information of the edge enabler server or service range information of the application instance. Specifically, refer to related descriptions in step 201a. Details are not described herein again.

806: The edge network configuration server stores the information about the application instance.

In this embodiment, step 806 is an optional step. In this embodiment, the edge network configuration server may store the information about the application instance carried in the first API publish request sent by the edge enabler server. In this case, the edge network configuration server implements a function of the core function CCF 1, and is connected to the API invoker by using the connection point 1 or the connection point 1e, and the UE may implement a function of the API invoker. Therefore, the edge network configuration server may provide the information about the application instance for the UE to use. That is, the common API framework core function CCF 1 may provide the information about the application instance for the API invoker to use.

807: The edge network configuration server sends a first API publish response to the edge enabler server.

In this embodiment, step 807 is an optional step. After the edge network configuration server receives the first API publish request sent by the edge enabler server, the edge network configuration server may send the first API publish response (interconnection service API publish response) to the edge enabler server. Optionally, the first API publish response may be used as a storage response, to notify the edge enabler server that the information about the application instance is successfully stored.

808: The UE sends identification information of the application and location information of the UE to the edge network configuration server.

809: The edge network configuration server sends an IP address of a third instance to the UE.

In this embodiment, step 808 and step 809 are similar to step 706 and step 707. Details are not described herein again.

In addition, in some other embodiments, the edge network configuration server, the edge enabler server, and the application instance server in the embodiment corresponding to FIG. 7 or FIG. 8 may reuse the function modules in the CAPIF framework in the following manner.

Specifically, the edge network configuration server may implement a function of the common API framework core function in FIG. 6A, and the edge enabler server may implement functions of one or more function modules in the API service domain in FIG. 6A. In this case, an interface between the edge enabler server and the edge network configuration server may be the connection point 3, the connection point 4, or the connection point 5. For example, the edge enabler server implements an API publishing function. In this case, the interface between the edge enabler server and the edge network configuration server includes some or all interface functions of the connection point 4. For example, the reference point 5 in FIG. 3 may include the some or all interface functions of the connection point 4; for example, the first interface 111 in FIG. 1A, FIG. 1C, or FIG. 1D may include the some or all interface functions of the connection point 4. Optionally, the application instance server may implement a function of the API invoker, the application instance server is connected to the edge network configuration server by using the connection point 1e, and the application instance server is connected to the edge enabler server by using the connection point 2e. The application instance server may implement the function of the API invoker. In this case, the application instance server may be connected to the edge network configuration server by using the connection point 1e.

In addition, there are further some implementations. The edge network configuration server may directly obtain the information about the application instance from the application instance server. In this case, the function modules in the CAPIF framework may be reused in the following manner.

Specifically, the edge network configuration server may implement a function of the common API framework core function in FIG. 6A, and the application instance server may implement functions of one or more function modules in the API service domain in FIG. 6A. In this case, an interface between the application instance server and the edge network configuration server may be the connection point 3, the connection point 4, or the connection point 5. For example, the application instance server implements an API publishing function. In this case, the interface between the application instance server and the edge network configuration server includes some or all interface functions of the connection point 4. For example, the reference point 5 in FIG. 3 may include the some or all interface functions of the connection point 4: for example, the first interface 111 in FIG. 1A, FIG. 1C, or FIG. 1D may include the some or all interface functions of the connection point 4.

In the embodiments, the solutions of the methods provided in the embodiments of this application are separately described from a perspective of the servers or the network elements and from a perspective of interaction between the servers or the network elements. It may be understood that, to implement the foregoing functions, the foregoing servers or devices such as the first server, the second server, the third server, and the first device include corresponding hardware structures and/or software modules for performing the functions. Persons skilled in the art should be easily aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 9:
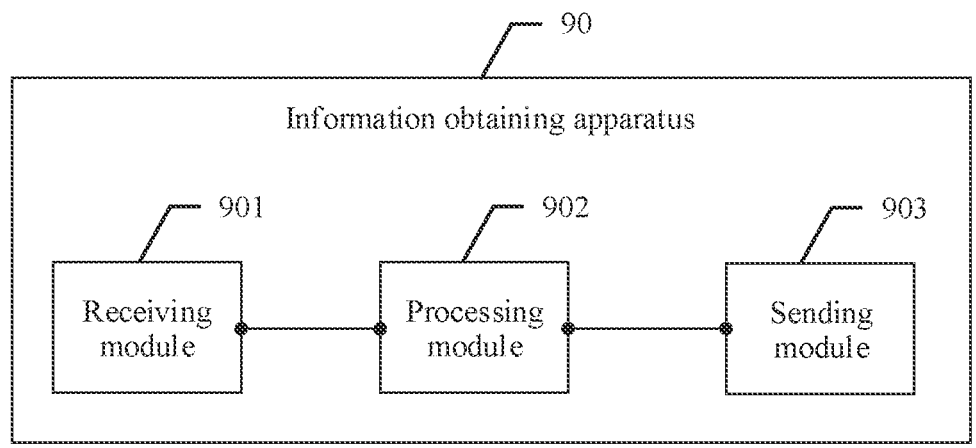
FIG. 9 is a schematic diagram of an embodiment of an information obtaining apparatus according to an embodiment of this application.

As shown in FIG. 9, an embodiment provides an information obtaining apparatus 90. The information obtaining apparatus 90 may implement corresponding functions by using software modules. In this case, the information obtaining apparatus 90 may be a chip or a system on chip in a first server. The information obtaining apparatus 90 may include a receiving module 901 and a processing module 902.

The receiving module 901 is configured to receive information about a first instance of an application from a second server, where the information about the first instance includes identification information of the application and first information, and the first information is used to indicate a location of the first instance. The receiving module 901 is further configured to receive information about a second instance of the application from a third server, where the information about the second instance includes the identification information of the application and second information, the second information is used to indicate a location of the second instance, and the first server is a server serving the second server and the third server.

In addition, the processing module 902 is configured to store the information about the first instance and the information about the second instance.

Therefore, the information obtaining apparatus 90 in this embodiment may respectively receive the information about the first instance of the application and the information about the second instance of the application from the second server and the third server, and store the information about the first instance of the application and the information about the second instance of the application. Therefore, a problem of storing the information about the application instances in edge networks is resolved, so that the information obtaining apparatus 90 sends the information about the application instances to another device (for example, a first device). When the another device needs to obtain the information about the application instances, the another device may directly obtain the information about the application instances from the information obtaining apparatus 90, and does not need to obtain the information about the application instances by querying the second server and the third server. Signaling overheads can be reduced, and a service delay can be reduced.

In an optional implementation, the receiving module 901 is further configured to receive area information of the second server from the second server or a first network element. The processing module 902 is further configured to obtain location information of user equipment. The processing module 902 is further configured to determine a target server based on the area information of the second server and the location information of the user equipment.

In another optional implementation, the first network element is an NEF network element, a UDM network element, a UDR network element, a PCF network element, or an NRF network element.

In another optional implementation, the receiving module 901 is further configured to receive an application identity from an EEC, where the target server serves an application instance corresponding to the application identity.

In another optional implementation, the information obtaining apparatus 90 further includes a sending module 903, configured to send a first application programming interface API discovery request to the second server and the third server, where the first API discovery request includes discovery type information, the discovery type information is used to indicate that the first API discovery request is used to request application instances, or the discovery type information is used to indicate that the first API discovery request is used to request application instances and an API, and the application instances include the first instance and the second instance. In such an implementation, it is proposed that the information obtaining apparatus 90 may reuse a discovery mechanism in a common API framework CAPIF. The information obtaining apparatus 90 does not need to separately configure a request for obtaining the information about the application instance. This can reduce signaling overheads between the information obtaining apparatus 90 and another information obtaining apparatus (for example, the second server or the third server), and further can reduce an application access delay caused by increasing signaling.

In another optional implementation, the receiving module 901 is specifically configured to receive a first API discovery response from the second server, where the first API discovery response includes the information about the first instance; and receive a second API discovery response from the third server, where the second API discovery response includes the information about the second instance. In such an implementation, it is proposed that the information obtaining apparatus 90 may reuse the discovery mechanism in the common API framework CAPIF, and it is also proposed that the information about the first instance is carried in the first API discovery response or the second API discovery response. Therefore, the information obtaining apparatus 90 may separately receive the information about the application instances from other information obtaining apparatuses (for example, the second server or the third server) by using existing signaling, where the other information obtaining apparatuses (for example, the second server and the third server) do not need to separately configure messages for sending the information about the application instances. Therefore, signaling overheads can be reduced, and further an application access delay caused by increasing signaling can be reduced.

In another optional implementation, the receiving module 901 is specifically configured to receive a first API publish request from the second server, where the first API publish request includes the information about the first instance of the application, and the first API publish request is used to publish an API and/or the first instance; and receive a second API publish request from the third server, where the second API publish request includes the information about the second instance of the application, and the second API publish request is used to publish an API and/or the second instance. In such an implementation, it is proposed that the information obtaining apparatus 90 may reuse a publish mechanism in a common API framework CAPIF, and it is also proposed that the information about the first instance is carried in the first API publish request, or the information about the second instance is carried in the second API publish request. Therefore, the information obtaining apparatus 90 may separately receive the information about the application instances from other information obtaining apparatuses (for example, the second server or the third server) by using existing signaling, where the other information obtaining apparatuses (for example, the second server and the third server) do not need to separately configure messages for sending the information about the application instances. Therefore, signaling overheads can be reduced, and further an application access delay caused by increasing signaling can be reduced.

In another optional implementation, the receiving module 901 is further configured to receive the identification information of the application and location information of a first device from the first device. The sending module 903 is further configured to send an IP address of a third instance to the first device, where the third instance is determined based on the identification information of the application, the location information of the first device, the information about the first instance of the application, and the information about the second instance of the application, and the third instance is the first instance or the second instance. In such an implementation, it is proposed that the information obtaining apparatus 90 may determine, based on the identification information of the application and the location information of the first device that are sent by the first device, to determine the third instance in the first instance and the second instance. In such an implementation, when the first device needs to obtain an application instance, the first device does not need to sequentially search the other information obtaining apparatuses (for example, the second server and the third server) for information about the application instance, but may directly obtain the information about the application instance from the information obtaining apparatus 90. Therefore, a signaling procedure in which the first device obtains the information about the application instance can be reduced, and further a network delay caused by increasing signaling can be reduced. In addition, the information obtaining apparatus 90 may further select, for the first device based on a requirement of the first device, an application instance that satisfies the requirement of the first device. Therefore, a process in which the first device obtains the information about the application instance is optimized.

There is another optional implementation. The sending module 903 is further configured to send one or more of the following to the first device: access identification information of a first edge network, an IP address of the first edge network, or an IP address of a first edge enabler server; or send one or more of the following to the first device: access identification information of a second edge network, an IP address of the second edge network, or an IP address of a second edge enabler server. In such an implementation, it is proposed that the information obtaining apparatus 90 not only sends the IP address of the application instance to the first device, but also sends one or more of access identification information of an edge network, an IP address of the edge network, or an IP address of the edge enabler server to the first device. Therefore, diversity of information provided by the information obtaining apparatus 90 for the first device is increased, so that information that is about the application instance and that is sent by the information obtaining apparatus 90 to the first device can better satisfy the requirement of the first device.

There is another implementation. The sending module 903 is further configured to send subscription requests to the second server and the third server, where the subscription requests are used to request to subscribe to the information about the application instances. In such an implementation, it is proposed that the information obtaining apparatus 90 may be based on a subscribe-notification mechanism, that is, the information obtaining apparatus 90 subscribes to the information about the application instance from the second server or the third server. In this case, when the information about the application instance in the second server or the third server is updated, the second server or the third server sends the information about the application instance to the information obtaining apparatus 90. Therefore, the information obtaining apparatus 90 only needs to send a message to the second server or the third server once, to receive the information about the application instance from the second server or the third server. Therefore, the signaling overheads can be reduced, and further an application access delay caused by increasing signaling can be reduced. Optionally, the subscription requests include subscription conditions, the subscription conditions are used to indicate the application instances, and the application instances include the first instance and the second instance.

Figure 10:
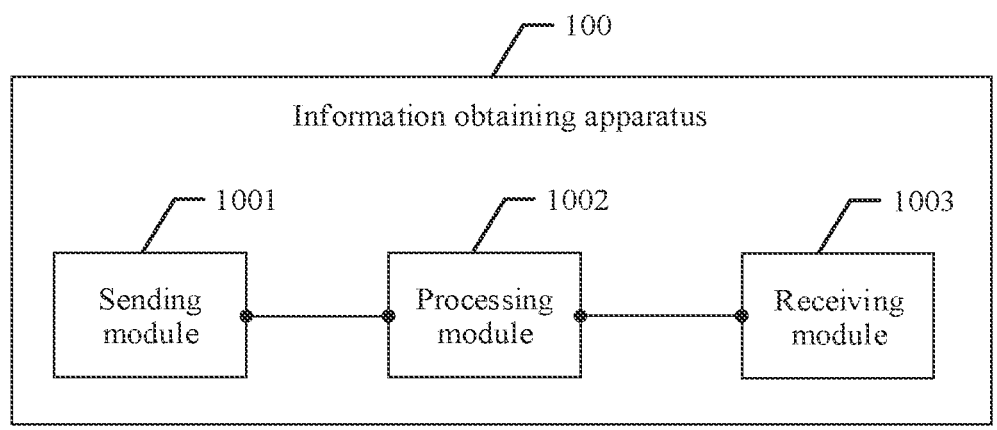
FIG. 10 is a schematic diagram of another embodiment of an information obtaining apparatus according to an embodiment of this application.

As shown in FIG. 10, an embodiment provides another information obtaining apparatus 100. The information obtaining apparatus 100 may implement corresponding functions by using software modules. In this case, the information obtaining apparatus 100 may be a chip or a system on chip in a second server. The information obtaining apparatus 100 may include a sending module 1001 and a processing module 1002.

The processing module 1002 is configured to obtain information about a first instance of an application, where the information about the first instance includes identification information of the application and first information, and the first information is used to indicate a location of the first instance.

The sending module 1001 is configured to send the information about the first instance to a first server, where the first server is a server serving the second server.

Therefore, the information obtaining apparatus 100 in this embodiment may send the obtained information about the first instance of the application to the first server, so that the first server can store in time the information about the first instance sent by the information obtaining apparatus 100. Therefore, this helps the first server store the information about the application instance in an edge network, so that the first server sends the information about the application instance to the another device (for example, a first device). In addition, in this way, the another device (for example, the first device) does not need to obtain the information about the application instance from the information obtaining apparatus 100, but can directly obtain the information about the application instance from the first server. Therefore, a procedure in which the first server obtains the information about the application instance can be reduced. When the another device needs to obtain the information about the application instances, the another device may directly obtain the information about the application instances from the first server, and does not need to obtain the information about the application instances by querying a plurality of information obtaining apparatuses 100. Signaling overheads can be reduced, and a service delay can be reduced.

In an optional implementation, the sending module 1001 is further configured to send area information of the second server to the first server.

In an optional implementation, the information obtaining apparatus 100 further includes:

The receiving module 1003 is configured to receive identification information of the first instance and an IP address of the first instance from a first instance server of the application. The processing module 1002 is further configured to determine the first information. In such an implementation, a manner in which the information obtaining apparatus 100 obtains the information about the first instance of the application is specified. The identification information of the first instance and the IP address of the first instance in the information about the first instance may be directly obtained by the information obtaining apparatus 100 from the first instance server of the application, and then the information obtaining apparatus 100 determines the first information. In such an implementation, the information about the first instance is obtained by the information obtaining apparatus 100 from different servers. Therefore, the information obtaining apparatus 100 can ensure integrity of the information about the first instance.

In another optional implementation, the information obtaining apparatus 100 further includes a receiving module, configured to receive the information about the first instance from a first instance server of the application. In such an implementation, it is proposed that the information obtaining apparatus 100 may directly obtain the information about the first instance from the first instance server of the application, that is, the information obtaining apparatus 100 may directly obtain identification information of the first instance, the IP address of the first instance, and the first information from the first instance server. Therefore, a procedure in which the information obtaining apparatus 100 obtains the information about the first instance can be simplified.

In another optional implementation, the receiving module is further configured to receive a first application programming interface API discovery request from the first server, where the first API discovery request includes discovery type information, the discovery type information is used to indicate that the first API discovery request is used to request an application instance, or the discovery type information is used to indicate that the first API discovery request is used to request an application instance and an API, and the application instance includes the first instance. In such an implementation, it is proposed that the information obtaining apparatus 100 may reuse a discovery mechanism in a common API framework CAPIF. Specifically, the first server may send the first API discovery request to the information obtaining apparatus 100, to trigger the information obtaining apparatus 100 to send the information about the first instance of the application to the first server. Therefore, the first server does not need to separately configure a request for obtaining the information about the application instance. This can reduce signaling overheads, and further can reduce an application access delay caused by increasing signaling.

In another optional implementation, the sending module 1001 is specifically configured to send a first API discovery response to the first server, where the first API discovery response includes the information about the first instance. In such an implementation, it is proposed that the information obtaining apparatus 100 may reuse the discovery mechanism in the common API framework CAPIF, and it is also proposed that the information about the first instance is carried in the first API discovery response. Therefore, the first server may receive the information about the application instance from the information obtaining apparatus 100 by using existing signaling, and the information obtaining apparatus 100 does not need to separately configure a message for sending the information about the application instance. Therefore, signaling overheads can be reduced, and further an application access delay caused by increasing signaling can be reduced.

In another optional implementation, the sending module 1001 is specifically configured to send a first API publish request to the first server, where the first API publish request includes the information about the first instance of the application, and the first API publish request is used to publish the API and/or the first instance. In such an implementation, it is proposed that the information obtaining apparatus 100 may reuse a publish mechanism in the common API framework CAPIF, and it is also proposed that the information about the first instance is carried in the first API publish request. Therefore, the first server may receive the information about the application instance from the information obtaining apparatus 100 by using existing signaling, and the information obtaining apparatus 100 does not need to separately configure a message for sending the information about the application instance. Therefore, signaling overheads can be reduced, and further an application access delay caused by increasing signaling can be reduced.

There is another implementation. The processing module 1002 is specifically configured to receive a third API publish request from the first instance server of the application, where the third API publish request includes the identification information of the first instance and the IP address of the first instance, and the third API publish request is used to publish the API and/or the first instance. In such an implementation, it is proposed that the first API publish request and the second publish request each further include the publish type information, and the publish type information is used to indicate a type of published content. Therefore, the first server may determine, based on the publish type information, whether the information carried in the first API publish request includes the information about the application instance.

There is another implementation. The receiving module 1003 is further configured to receive a subscription request from the first server, where the subscription request is used to request to subscribe to the information about the application instance. In such an implementation, it is proposed that the information obtaining apparatus 100 may be based on a subscribe-notification mechanism, that is, the information obtaining apparatus 100 receives the subscription request from the first server. In this case, when the information about the application instance in the information obtaining apparatus 100 is updated, the information obtaining apparatus 100 sends the information about the application instance to the first server. Therefore, the first server only needs to send a message to the information obtaining apparatus 100 once, to receive the information about the application instance from the information obtaining apparatus 100. Therefore, the signaling overheads can be reduced, and further an application access delay caused by increasing signaling can be reduced. Optionally, the subscription request includes a subscription condition, the subscription condition is used to indicate the application instances, and the application instances include the first instance and the second instance.

Figure 11:
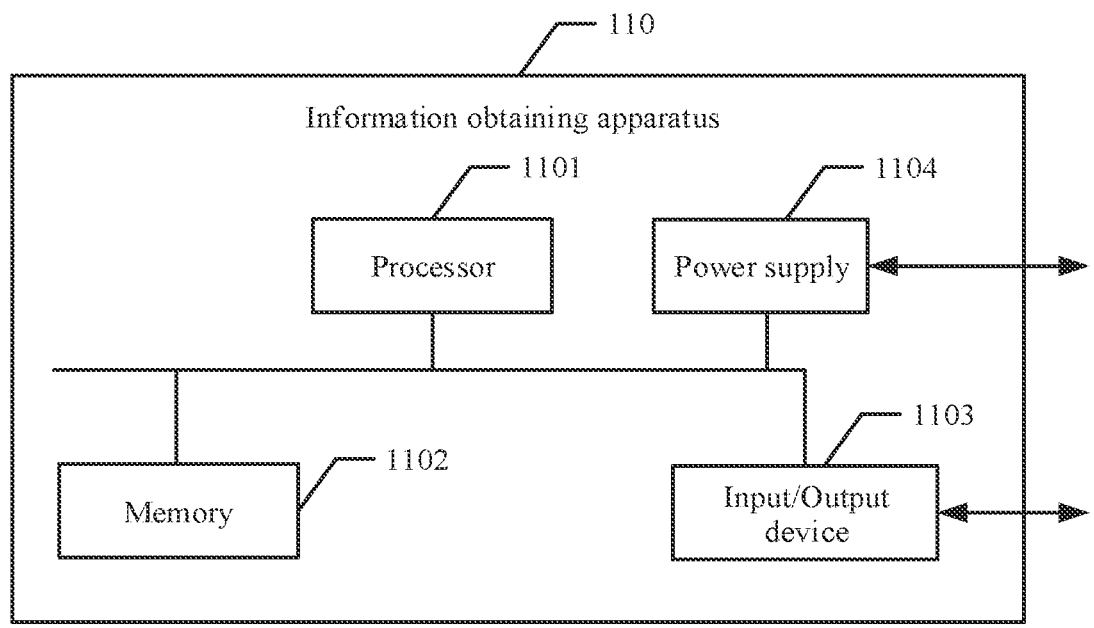
FIG. 11 is a schematic diagram of another embodiment of an information obtaining apparatus according to an embodiment of this application.

As shown in FIG. 11, an embodiment provides a schematic diagram of a structure of an information obtaining apparatus 110. The information obtaining apparatus 110 may be the first server in the foregoing embodiment corresponding to FIG. 2, may be the edge network configuration server in the embodiments corresponding to FIG. 4 and FIG. 5 or FIG. 7 and FIG. 8, or may be a chip or a system on chip on the first server or the edge network configuration server.

The information obtaining apparatus 110 includes a processor 1101 and a memory 1102. The memory 1102 is configured to store a program, and the processor 1101 is configured to execute the program in the memory 1102, to implement functions of the first server in the method embodiments of this application. For example, the processor 1101 may be configured to store the information about the first instance and the information about the second instance.

Specifically, the processor 1101 may include one or more processors, and the memory 1102 may include one or more storage media (for example, one or more mass storage devices). The processor 1101 may be configured to: process a server protocol and data, control an entire server, execute a software program, and process data of the software program. For example, the processor 1101 is configured to support the information obtaining apparatus 110 in performing the actions described in the foregoing embodiments. Optionally, the information obtaining apparatus 110 may include a baseband processor and a central processing unit, or integrate functions of the baseband processor and the central processing unit. Persons skilled in the art may understand that the baseband processor and the central processing unit may be processors independent of each other and are interconnected by using technologies such as a bus. Persons skilled in the art may understand that the information obtaining apparatus 110 may include a plurality of baseband processors to adapt to different network standards. The information obtaining apparatus 110 may include a plurality of central processing units to enhance a processing capability of the information obtaining apparatus 110. Components of the information obtaining apparatus 110 may be connected by using various buses. The foregoing baseband processor may alternatively be expressed as a baseband processing circuit or a baseband processing chip. The foregoing central processing unit may alternatively be expressed as a central processing circuit or a central processing chip.

A function of processing the server protocol and the data may be built in the processor, or may be stored in the memory in a form of the software program. The processor executes the software program to implement a baseband processing function.

In this embodiment, the memory 1102 is mainly configured to store the software program and the data. The memory 1102 may exist independently, or may be connected to the processor 1101. Optionally, the memory 1102 and the processor 1101 may be integrated, for example, integrated into one or more chips. The memory 1102 can store program code for execution the technical solutions in the embodiments of this application, and the processor 1101 controls the execution. Various types of executed computer program code may also be considered as drivers of the processor 1101. It should be understood that FIG. 11 in this embodiment shows only one memory and one processor. However, during actual application, the information obtaining apparatus 110 may include a plurality of processor or a plurality of memory. This is not specifically limited herein. In addition, the memory 1102 may also be referred to as a storage medium, a storage device, or the like. The memory 1102 may be a storage element located on a same chip as the processor, namely, an on-chip storage element, or may be an independent storage element. This is not limited in this embodiment of this application.

In addition, the information obtaining apparatus 110 further includes an input/output device 1103, and the input/output device 1103 may be used by the information obtaining apparatus 110 to communicate with another device. For example, the information obtaining apparatus 110 receives information about a first instance of an application from a second server, where the information about the first instance includes identification information of the application and first information, and the first information is used to indicate a location of the first instance. The input/output device 1103 is further configured to receive information about a second instance of the application from a third server, where the information about the second instance includes the identification information of the application and second information, the second information is used to indicate a location of the second instance, and the first server is a server serving the second server and the third server.

Optionally, the input/output device 1103 may include an interface configured to communicate with another device, for example, the first interface 111 or the second interface 112 in FIG. 1A, FIG. 1C, or FIG. 1D; or the reference point 5 or the reference point 4 in the FIG. 3.

Optionally, the information obtaining apparatus 110 may further include one or more power supplies 1104 and/or one or more operating systems such as Windows Server™, Mac OS X™, Unix™, Linux™, and FreeBSD™.

It should be further understood that, in the method embodiments corresponding to FIG. 2, FIG. 4, FIG. 5, FIG. 7, and FIG. 8, steps performed by the first server or the edge network configuration server may all be based on the structure of the information obtaining apparatus 110 shown in FIG. 11.

Therefore, the information obtaining apparatus 110 in this embodiment may respectively receive the information about the first instance of the application and the information about the second instance of the application from the second server and the third server, and store the information about the first instance of the application and the information about the second instance of the application. Therefore, a problem of storing the information about the application instances in edge networks is resolved, so that the information obtaining apparatus 90 sends the information about the application instances to another device (for example, a first device).

Figure 12:
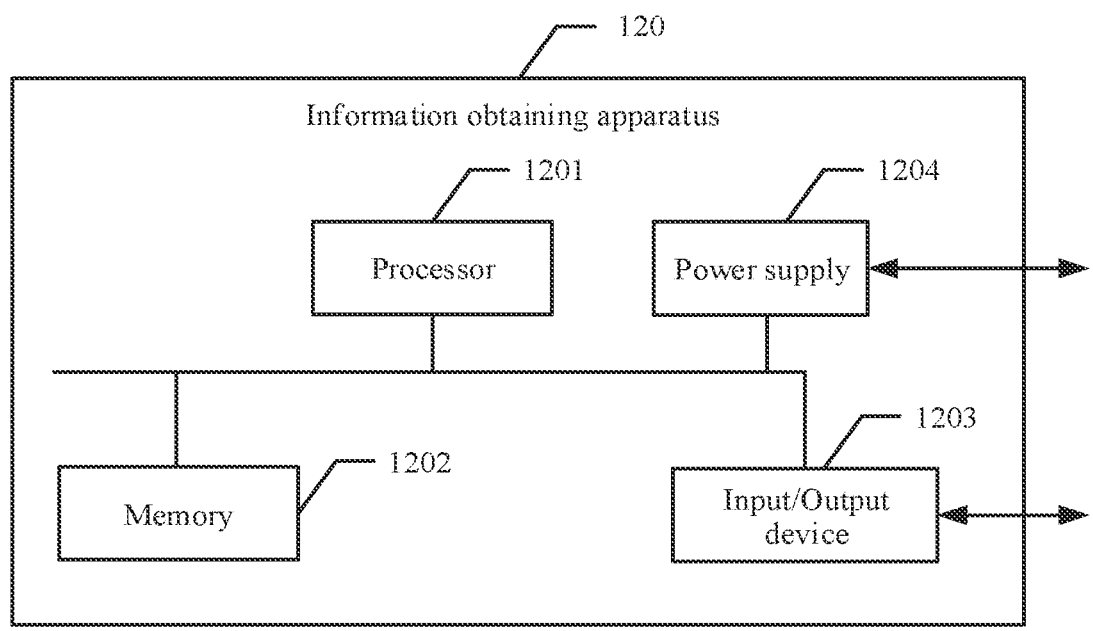
FIG. 12 is a schematic diagram of another embodiment of an information obtaining apparatus according to an embodiment of this application.

As shown in FIG. 12, an embodiment provides a schematic diagram of a structure of another information obtaining apparatus 120. The information obtaining apparatus 120 may be the second server in the foregoing embodiment corresponding to FIG. 2, may be the edge enabler server in the embodiments corresponding to FIG. 4 and FIG. 5 or FIG. 7 and FIG. 8, or may be a chip or a system on chip on the second server or the edge enabler server.

The information obtaining apparatus 120 includes a processor 1201 and a memory 1202. The memory 1202 is configured to store a program, and the processor 1201 is configured to execute the program in the memory 1202, to implement functions of the second server in the method embodiments of this application. For example, the processor 1201 may be configured to obtain the information about the first instance of the application.

Specifically, the processor 1201 may include one or more processors, and the memory 1202 may include one or more storage media (for example, one or more mass storage devices). The processor 1201 and the memory 1202 are similar to the processor 1101 and the memory 1102 described in the embodiment corresponding to FIG. 11. Details are not described herein again.

In addition, the information obtaining apparatus 120 further includes an input/output device 1203, and the input/output device 1203 may be used by the information obtaining apparatus 120 to communicate with another device. For example, A first server sends the information about the first instance, and the first server is a server serving the second server.

Optionally, the input/output device 1203 may include an interface configured to communicate with another device, for example, the first interface 111 in FIG. 1A, FIG. 1C, or FIG. 1D; the fourth interface 114 in FIG. 1C or FIG. 1D; the seventh interface 117 in FIG. 1D; or the reference point 1, the reference point 2, the reference point 3, or the reference point 5 in FIG. 3.

Optionally, the information obtaining apparatus 120 may further include one or more power supplies 1204 and/or one or more operating systems such as Windows Server™, Mac OS X™, Unix™, Linux™, and FreeBSD™.

It should be further understood that, in the method embodiments corresponding to FIG. 2, FIG. 4, FIG. 5, FIG. 7, and FIG. 8, steps performed by the second server or the edge enabler server may all be based on the structure of the information obtaining apparatus 120 shown in FIG. 12.

Therefore, the information obtaining apparatus 120 in this embodiment may send the obtained information about the first instance of the application to the first server, so that the first server can store in time the information about the first instance sent by the information obtaining apparatus 120. Therefore, this helps the first server store the information about the application instance in an edge network, so that the first server sends the information about the application instance to the another device (for example, a first device). In addition, in this way, the another device (for example, the first device) does not need to obtain the information about the application instance from the information obtaining apparatus 120, but can directly obtain the information about the application instance from the first server. Therefore, a procedure in which the first server obtains the information about the application instance can be reduced.

It should be further understood that functions implemented by the third server in the method embodiments corresponding to FIG. 2, FIG. 4, FIG. 5, FIG. 7, and FIG. 8 are similar to functions implemented by the foregoing second server. Steps performed by the third server may also be based on the structure of the information obtaining apparatus 120 shown in FIG. 12.

Figure 13:
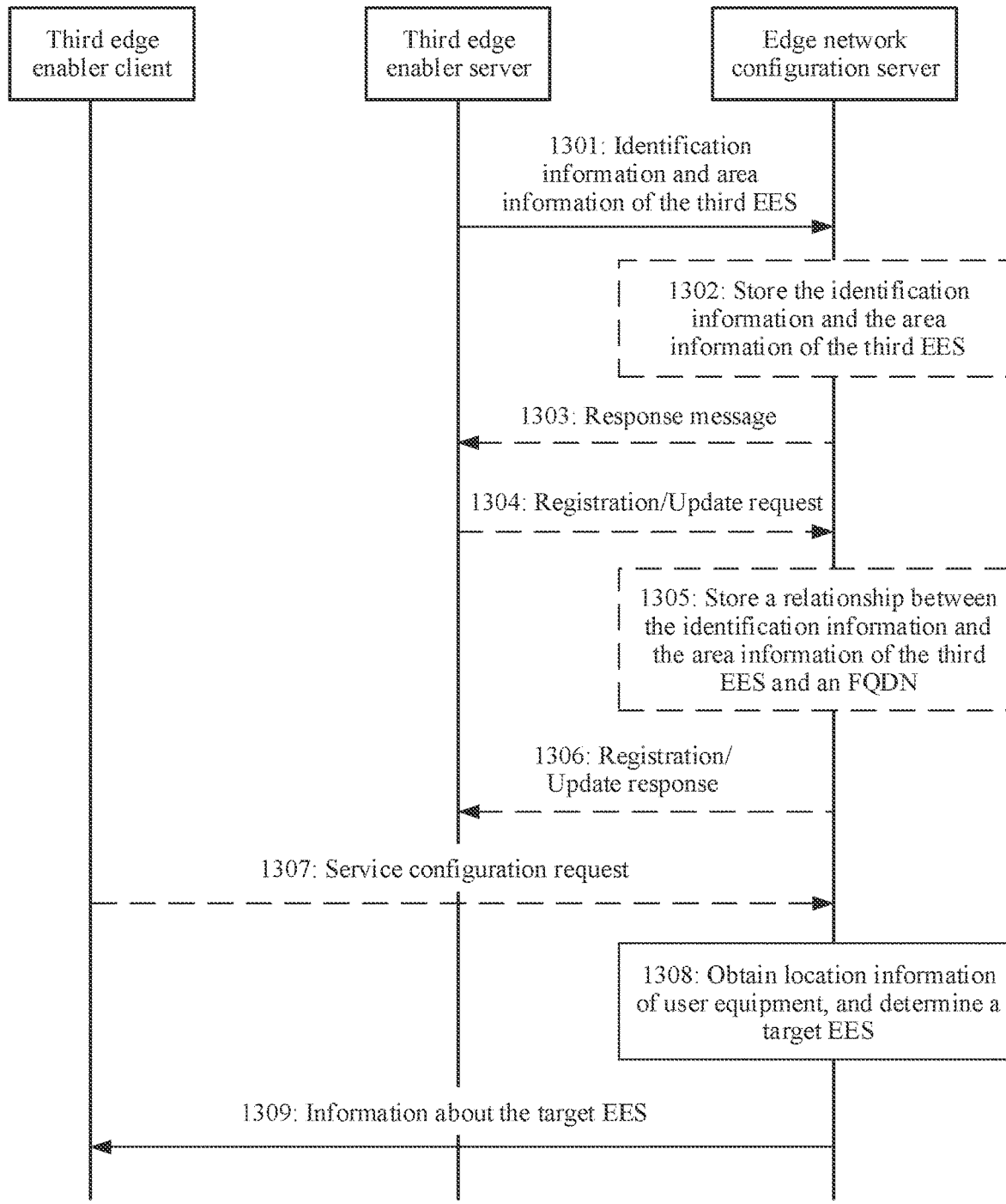
FIG. 13 is another flowchart of an information obtaining method according to an embodiment of this application.

FIG. 13 is a flowchart of an information obtaining method according to this application. FIG. 13 may be applied to a scenario in which an EES and area information corresponding to the EES have been preconfigured in the EES. The method includes the following steps.

1301: A third edge enabler server (EES) sends identification information and area information of the third EES to an edge network configuration server (edge configuration server, ECS). Correspondingly, the edge network configuration server receives the identification information and the area information of the third EES from the third edge enabler server.

There may be one or more third EESs. When there are a plurality of third EESs, area information of third EESs indicates that each EES corresponds to respective area information of the EES, and respective area information of the plurality of EESs may be the same or different.

The identification information of the third EES is used to identify the third EES. For example, the identification information of the third EES may be one or more of the following: an ID of the third EES, an IP address of the third EES, a URL of the third EES, or an FQDN of the third EES. When there are the plurality of third EESs, identification information of the third EESs is an EES identity list, and each EES corresponds to one EES identity in the list.

The area information of the third EES is used to indicate a network topology area, physical area information, or a network topology access address that may be used for connection to the third EES. For example, the area information of the third EES may also be referred to as network topology area information of the third EES. The area information of the third EES may include one or more of the following: identities or IP address information of one or more UPF network elements, one or more DNAIs, some or all service area information of a local area data network (local area data network, LADN), or an identity of the LADN.

For example, the third EES sends the identification information and the area information of the third EES to the ECS by using a request message. The area information of the third EES may be sent to the ECS as attribute information of the third EES. Optionally, the request message further includes access address information of the third EES, for example, the IP address or the URL of the third EES. For example, the request message may be a registration request message, a registration update request message, or another message used by the EES to send signaling to the ECS.

Optionally, the third EES sends, to the ECS only once, the area information corresponding to the third EES. In other words, if the third EES sends, to the ECS for a plurality of times, registration request messages, registration update request messages, or other message used by the EES send signaling to the ECS, the third EES sends the area information of the third EES to the ECS by using one of the messages. For example, the third EES sends the area information of the third EES to the ECS by using the first registration request message.

1302: The ECS stores the identification information and the area information of the third EES.

Step 1302 is an optional step.

When the area information of the third EES is the service area information of the LADN, the ECS requests the service area information of the LADN from a network management server, an OSS network element, or a network element (network function, NF). The ECS stores the identification information of the third EES and the service area information of the LADN. For example, when the area information of the third EES is one or more DNAIs, a form in which the identification information and the area information of the third EES are stored in the ECS is shown in Table 1. In Table 1, there are two third EESs, and identification information of the third EESs is an EES ID #1 and an EES ID #2. Area information of a third EES corresponding to the EES ID #1 is a DNAI #1 and a DNAI #2. Area information of a third EES corresponding to the EES ID #2 is a DNAI #3. Optionally, the area information of the third EES is stored as the attribute information of the third EES. The attribute information of the third EES further includes an access address of the third EES. For example, an access address of the third EES corresponding to the EES ID #1 is an IP #1, and an access address of the third EES corresponding to the EES ID #1 is an IP #2.

TABLE 1

| Third EES | Attribute information of the third EES |
| --- | --- |
| EES ID #1 | Access address of a third EES: an IP #1<br>Area information of the third EES: a DNAI #1 and a DNAI #2 |
| EES ID #2 | Access address of a third EES: an IP #2<br>Area information of the third EES: a DNAI #3 |

1303: The ECS sends a response message to the third EES. Correspondingly, the third EES receives the response message from the ECS.

Step 1303 is an optional step.

For example, the response message may be an EES registration response message, an EES registration update response message, or another response message of the signaling sent by the EES to the ECS.

1304: The third EES sends a registration/update request to the ECS.

Correspondingly, the ECS receives the registration/update request from the third EES.

Step 1304 is an optional step.

For example, the registration/update request further includes an application identity FQDN and the identification information of the third EES. The request message is used to indicate that an application identified by the FQDN is registered with the third EES.

1305: The ECS stores a relationship between the identification information and the area information of the third EES and the FQDN.

Step 1305 is an optional step.

For example, an identity of the third EES and the area information of the third EES and the application identity and the identity of the third EES that are received in step 1304 may be stored separately, and are associated by using the identity of the third EES. For example, a storage form of the identity of third EES and the area information of the third EES is shown in Table 1, and a storage form of the application identity and the identity of the third EES is shown in Table 2. In Table 2, identities of third EESs with which an application corresponding to an application identity FQDN #1 registers are an EES ID #1 and an EES ID #2, and an identity of a third EES with which an application corresponding to an application identity FQDN #2 is registered is the EES ID #1.

TABLE 2

| Application identity | Identity of a third EES with which an application is registered |
| --- | --- |
| FQDN #1 | EES ID #1 and EES ID #2 |
| FQDN #2 | EES ID #1 |

Alternatively, an identity of the third EES, the area information of the third EES, and the application identity received in step 1304 may be stored together, as shown in Table 3 or Table 4.

In Table 3, there are two third EESs, and identification information of the third EESs is an EES ID #1 and an EES ID #2. Area information of a third EES corresponding to the EES ID #1 is a DNAI #1 and a DNAI #2, and application identities registered in the corresponding third EES are an FQDN #1 and an FQDN #2. Area information of a third EES corresponding to the EES ID #2 is a DNAI #3, and an application identity registered in the corresponding third EES is the FQDN #1. Optionally, the area information of the third EES and the registered application identity are stored as the attribute information of the third EES. The attribute information of the third EES further includes the access address of the third EES. For example, an access address of the third EES corresponding to the EES ID #1 is an IP #1, and an access address of the third EES corresponding to the EES ID #2 is an IP #2.

TABLE 3

| Third EES | Attribute information of the third EES |
| --- | --- |
| EES ID #1 | Access address of a third EES: an IP #1<br>Area information of the third EES: a DNAI #1 and a DNAI #2<br>Application identities registered in the third EES: an FQDN #1 and an FQDN #2 |
| EES ID #2 | Access address of a third EES: an IP #2<br>Area information of the third EES: a DNAI #3<br>Application identity registered in the third EES: the FQDN #1 |

In Table 4, there are two third EESs whose application identities are an FQDN #1, and identification information of the third EESs is an EES ID #1 and an EES ID #2. Area information of a third EES corresponding to the EES ID #1 is a DN #1 and a DNAI #2. Area information of a third EES corresponding to the EES ID #2 is a DNAI #3. Area information of a third EES corresponding to the EES ID #2 is a DNAI #3. There is one third EES whose application identity is an FQDN #2, identification information of the third EES is the EES ID #1, and the area information of the third EES corresponding to the EES ID #1 is the DNAI #1 and the DNAI #2. Optionally, Table 4 further includes access addresses of the third EESs. For example, an access address of the third EES corresponding to the EES ID #1 is an IP #1, and an access address of the third EES corresponding to the EES ID #2 is an IP #2.

TABLE 4

| Application identity | Third EES |
| --- | --- |
| FQDN #1 | EES ID #1-IP #1, DNAI #1, DNAI #2, EES ID #2-IP #2, and DNAI 3 |
| FQDN #2 | EES ID #1-IP #1, DNAI #1, and DNAI #2 |

1306: The ECS sends a registration/update response message to the third EES. Correspondingly, the third EES receives the registration/update response message from the ECS.

Step 1306 is an optional step.

For example, the registration response message may be used to indicate that registration succeeds or fails. Alternatively, the update response message may be used to indicate that update succeeds or fails.

1307: An EEC sends a service configuration request to the ECS. Correspondingly, the ECS receives the service configuration request from the EEC.

Step 1307 is an optional step.

For example, the service configuration request includes any one or more of the following: a user equipment identity, EEC identification information, or the application identity FQDN. The user equipment identity is an identity of user equipment in which the EEC is located, and the EEC identity is used to identify the EEC. Optionally, the service configuration request further includes location information of the user equipment in which the EEC is located.

1308: The ECS obtains the location information of the user equipment, and determines a target EES.

The target EES is one or more third EESs.

For example, the location information of the user equipment may include one or more of the following: a cell identity (cell ID), a TAI, a DNAI(s), an identity or an IP address of an anchor UPF network element of the user equipment, or other information that may indicate a network topology location or a geographical location of the UE in a network.

For example, the ECS may obtain the location information of the user equipment from the service configuration request in step 1307. Alternatively, the ECS may obtain the location information of the user equipment from a network side.

For example, the ECS determines the target EES based on the area information of the third EES and the location information of the user equipment. Area information of the target EES matches the location information of the user equipment. For example, the ECS may determine the target EES based on the area information of the third EES and the location information of the user equipment in any one of the following manners: Manner 1: The ECS determines that the location information TAI/Cell ID/DNAI(s) of the user equipment is a subset of the area information of the target EES. Manner 2: The ECS determines that a location of the user equipment is located in an area of the target EES. Manner 3: The ECS determines that the location of the user equipment is closest to a physical location of an edge or a center of the area of the EES.

Optionally, if the application identity FQDN is included in step 1304, the ECS determines the target EES based on the area information of the third EES, the location information of the user equipment, and the application identity. The target EES may provide an application identified by the FQDN and requested by the EEC. If there are a plurality of EESs that satisfy a condition, the ECS may determine a unique EES based on distances between the user equipment and the EESs (for example, network topology distances or physical distances from the location of the user equipment to network topology area boundaries corresponding to the EESs) or another parameter. Alternatively, the ECS determines a plurality of target EESs, and marks a priority for each EES.

1309: The ECS sends information about the target EES to the EEC. Correspondingly, the EEC receives the information about the target EES from the ECS.

For example, the information about the target EES is access information of the target EES. For example, the access information of the target EES is an IP address or a URL.

For example, the ECS sends the information about the target EES to the third EES by using a service configuration response. The service configuration response further includes an FQDN corresponding to the target EES.

According to the method shown in FIG. 13, the ECS may determine the target EES based on the area information of the EES and the location information of the user equipment. Therefore, the ECS may select, for the user equipment by obtaining the area information of the EES and the location information of the user equipment, a target EES that matches the location of the user equipment or is closest to the user equipment, that is, select an EDN in which the target EES is located. When the user equipment requests the EES to discover an application instance, it may be ensured that the application instance accessed by the user equipment is an application instance that matches the location of the user equipment or is closest to the user equipment. In addition, the ECS obtains the area information of the third EES during interaction with one or more third EESs, no additional signaling needs to be introduced, so that system implementation is simplified. In this way, user experience is improved, and a transmission delay is reduced.

Figure 14:
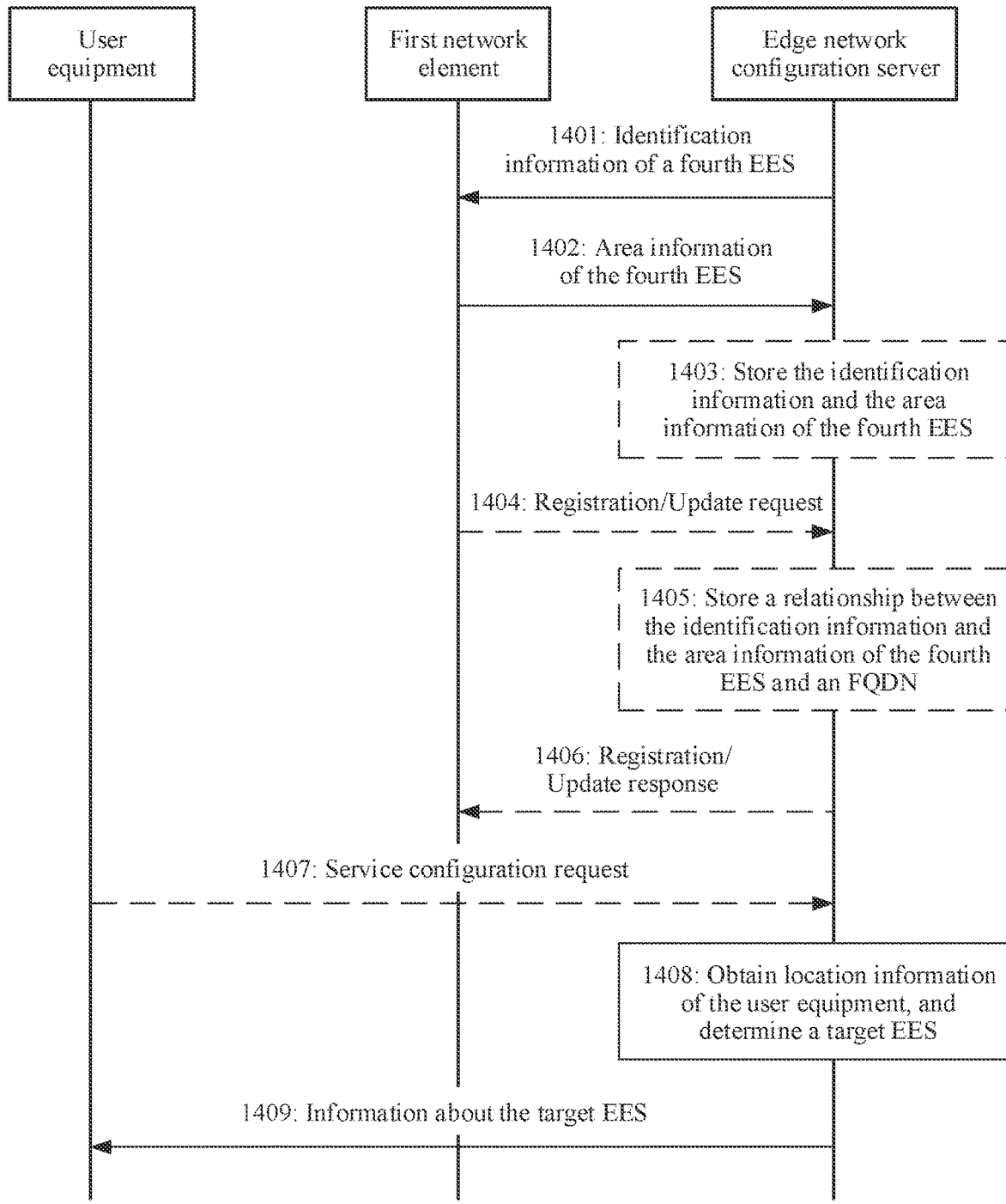
FIG. 14 is another flowchart of an information obtaining method according to an embodiment of this application.

FIG. 14 is a flowchart of an information obtaining method according to this application. FIG. 14 may be applied to a scenario in which a first network element has obtained a fourth EES and area information corresponding to the fourth EES and the fourth EES has been registered with an ECS. The first network element may obtain, in a pre-configuration manner or receiving from the fourth EES, the fourth EES and the area information corresponding to the fourth EES. For the method in FIG. 14, refer to the descriptions in FIG. 13. The method includes the following steps.

1401: The ECS sends identification information of the fourth EES to the first network element. Correspondingly, the first network element receives the identification information of the fourth EES from the ECS.

There may be one or more fourth EESs.

For example, for descriptions of the identification information of the fourth EES, refer to the descriptions of the identification information of the third EES in step 1301 in FIG. 13. Details are not described herein again.

The first network element may be a network exposure function (network exposure function, NEF) network element, a unified data management (unified data management, UDM) network element, a UDR network element, a PCF network element, or a network repository function (network repository function, NRF) network element.

For example, when there are a plurality of fourth EESs, the ECS sends the identification information of the fourth EES to the first network element in a form of an identity list of the fourth EES.

For example, the ECS sends the identification information of the fourth EES to the first network element by using an EES information request message, where the EES information request message is used to request the area information of the fourth EES.

1402: The first network element sends the area information of the fourth EES to the ECS. Correspondingly, the ECS receives the area information of the fourth EES from the first network element.

For example, for descriptions of the area information of the fourth EES, refer to the descriptions of the area information of the third EES in step 1301 in FIG. 13. Details are not described herein again.

1403: The ECS stores the identification information and the area information of the fourth EES.

Step 1403 is an optional step.

For example, for step 1402, refer to the descriptions that the ECS stores the identification information and the area information of the third EES in step 1302 in FIG. 13. Details are not described herein again.

1404: The first network element sends a registration/update request to the ECS. Correspondingly, the ECS receives the registration/update request from the first network element.

Step 1404 is an optional step.

For example, the registration/update request further includes an application identity FQDN and the identification information of the fourth EES. The request message is used to indicate that an application identified by the FQDN is registered with the fourth EES.

1405. The ECS stores a relationship between the identification information and the area information of the fourth EES and the FQDN.

Step 1405 is an optional step.

For example, for step 1405, refer to the descriptions that the ECS stores the relationship between the identification information and the area information of the fourth EES and the FQDN in step 1305 in FIG. 13. Details are not described herein again.

1406: The ECS sends a registration/update response message to the first network element. Correspondingly, the first network element receives the registration/update response message from the ECS.

Step 1406 is an optional step.

For example, the registration response message may be used to indicate that registration succeeds or fails. Alternatively, the update response message may be used to indicate that update succeeds or fails.

The method shown in FIG. 14 further includes step 1407 to 1409. Step 1407 is an optional step. For example, for steps 1407 to 1409, refer to the descriptions of steps 1307 to 1309 in FIG. 13. Details are not described herein again.

According to the method shown in FIG. 14, the ECS may determine a target EES based on the area information of the EES and location information of user equipment. Therefore, the ECS may select, for the user equipment by obtaining the area information of the EES and the location information of the user equipment, a target EES that matches a location of the user equipment or is closest to the user equipment, that is, select an EDN in which the target EES is located. When the user equipment requests the EES to discover an application instance, it may be ensured that the application instance accessed by the user equipment is an application instance that matches the location of the user equipment or is closest to the user equipment. Further, location information of a plurality of or even all fourth EESs may be obtained once by obtaining location information of a plurality of fourth EESs from the first network element, so that system performance efficiency is improved. In this way, user experience is improved, and a transmission delay is reduced.

One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may include but is not limited to at least one of the following: various computing devices that run software, for example, a central processing unit, a microprocessor, a digital signal processor (digital signal processing, DSP), a microcontroller unit (microcontroller unit, MCU), or an artificial intelligence processor. Each computing device may include one or more cores for executing software instructions to perform operations or processing. The processor may be built in a system on chip (system on chip, SoC) or an application specific integrated circuit (application specific integrated circuit, ASIC), or may be an independent semiconductor chip. The processor includes a core for executing software instructions to perform operations or processing, and may further include a necessary hardware accelerator, for example, a field programmable gate array (field programmable gate array, FPGA), a programmable logic circuit (programmable logic device, PLD), or a logic circuit that implements a special-purpose logic operation.

When the foregoing modules or units are implemented by using hardware, the hardware may be any one or any combination of a CPU, a microcontroller unit, a DSP, an MCU, an artificial intelligence processor, an ASIC, an SoC, an FPGA, a PLD, a dedicated digital circuit, a hardware accelerator, or a non-integrated discrete device, and the hardware may run necessary software or does not depend on software, to perform the foregoing method procedures.

When the foregoing modules or units are implemented by using software, the foregoing modules or units may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state drive (solid state disk, SSD)), or the like.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof. Such modifications or replacements do not make the essence of the corresponding technical solutions depart from the and the scope of the technical solutions of the embodiments of this application.

What is claimed is:

1. An information obtaining method, comprising:
receiving, by a first server, information about a first instance of an application from a second server, wherein the information about the first instance comprises identification information of the application and first information, and the first information indicates a location of the first instance, wherein the first information comprises an internet protocol (IP) address of the first instance;
receiving, by the first server, information about a second instance of the application from a third server, wherein the information about the second instance comprises the identification information of the application and second information, the second information indicates a location of the second instance, wherein the second information comprises an IP address of the second instance, and wherein the first server is a server serving the second server and the third server; and
storing, by the first server, the information about the first instance and the information about the second instance.

2. The method according to claim 1, further comprising:
receiving, by the first server, area information of the second server from the second server or a first network element;
obtaining, by the first server, location information of user equipment; and
determining, by the first server, a target server based on the area information of the second server and the location information of the user equipment.

3. The method according to claim 2, further comprising:
receiving, by the first server, an application identity from an edge enabler client (EEC), wherein the target server serves an application instance corresponding to the application identity.

4. The method according to claim 1, wherein:
the first information comprises one or more of the following:
access identification information of a first edge network, an IP address of the first edge network, or an IP address of a first edge enabler server, wherein the second server is located in the first edge network; and
the second information comprises one or more of the following:
access identification information of a second edge network, an IP address of the second edge network, or an IP address of a second edge enabler server, wherein the third server is located in the second edge network.

5. The method according to claim 1, wherein the method further comprises:
sending, by the first server, a first application programming interface (API) discovery request to the second server, wherein the first API discovery request comprises discovery type information, the discovery type information indicates that the first API discovery request comprises a request for application instances, or the discovery type information is used to indicates that the first API discovery request comprises a request for application instances and an API, and wherein the application instances comprise the first instance and the second instance; and
sending, by the first server, the first API discovery request to the third server.

6. The method according to claim 5, wherein:
the receiving, by a first server, information about a first instance of an application from a second server comprises:
receiving, by the first server, a first API discovery response from the second server, wherein the first API discovery response comprises the information about the first instance; and
the receiving, by the first server, information about a second instance of the application from a third server comprises:
receiving, by the first server, a second API discovery response from the third server, wherein the second API discovery response comprises the information about the second instance.

7. The method according to claim 6, wherein:
the receiving, by a first server, information about a first instance of an application from a second server comprises:
receiving, by the first server, a first API publish request from the second server, wherein the first API publish request comprises the information about the first instance of the application, and the first API publish request is used to publish at least one of an API or the first instance; and
the receiving, by the first server, information about a second instance of the application from a third server comprises:
receiving, by the first server, a second API publish request from the third server, wherein the second API publish request comprises the information about the second instance of the application, and the second API publish request is used to publish at least one of an API or the second instance.

8. The method according to claim 7, wherein:
the information about the first instance of the application further comprises one or more of the following:
identification information of a second edge enabler server, or service range information of the second instance.

9. The method according to claim 1, wherein the method further comprises:
receiving, by the first server, the identification information of the application and location information of a first device from the first device; and
sending, by the first server, an IP address of a third instance to the first device, wherein the third instance is determined based on the identification information of the application, the location information of the first device, the information about the first instance of the application, and the information about the second instance of the application, and wherein the third instance is the first instance or the second instance.

10. The method according to claim 9, wherein the method further comprises:
when the IP address of the third instance is the IP address of the first instance, sending, by the first server, one or more of the following to the first device:
access identification information of a first edge network, the IP address of the first edge network, or the IP address of a first edge enabler server; or when the IP address of the third instance is the IP address of the second instance, sending, by the first server, one or more of the following to the first device:
access identification information of a second edge network, the IP address of the second edge network, or the IP address of a second edge enabler server.

11. An information obtaining method, comprising:
obtaining, by a second server, information about a first instance of an application, wherein the information about the first instance comprises identification information of the application and first information, and the first information indicates a location of the first instance, wherein the first information comprises an internet protocol (IP) address of the first instance; and
sending, by the second server, the information about the first instance to a first server, wherein the first server is a server serving the second server.

12. The method according to claim 10, further comprising:
sending, by the second server, area information of the second server to the first server.

13. The method according to claim 11, wherein the first information comprises one or more of the following:
access identification information of a first edge network, an IP address of the first edge network, or an IP address of a first edge enabler server, wherein the second server is located in the first edge network.

14. The method according to claim 11, wherein the obtaining, by a second server, information about a first instance of an application comprises:
receiving, by the second server, identification information of the first instance and an IP address of the first instance from a first instance server of the application; and
obtaining, by the second server, the first information locally.

15. The method according to claim 11, wherein the obtaining, by a second server, information about a first instance of an application comprises:
receiving, by the second server, the information about the first instance from a first instance server of the application.

16. The method according to claim 11, further comprising:
receiving, by the second server, a first application programming interface (API) discovery request from the first server, wherein the first API discovery request comprises discovery type information, the discovery type information indicates that the first API discovery request comprises a request for an application instance, or the discovery type information indicates that the first API discovery request comprises a request for an application instance and an API, and wherein the application instance comprises the first instance.

17. The method according to claim 16, wherein the sending, by the second server, the information about the first instance to a first server comprises:

sending, by the second server, a first API discovery response to the first server, wherein the first API discovery response comprises the information about the first instance.

18. The method according to claim 11, wherein the sending, by the second server, the information about the first instance to a first server comprises:
sending, by the second server, a first API publish request to the first server, wherein the first API publish request comprises the information about the first instance of the application, and the first API publish request is used to publish at least one of the API or the first instance.

19. The method according to claim 11, wherein the information about the first instance of the application further comprises one or more of the following:
identification information of a first edge enabler server, or service range information of the first instance.

20. A apparatus, comprising:
at least one processor; and
one or more memories coupled to the at least one processor and storing one or more instructions for execution by the at least one processor to perform operations comprising:
receiving information about a first instance of an application from a second server, wherein the information about the first instance comprises identification information of the application and first information, and the first information indicates a location of the first instance, wherein the first information comprises an internet protocol (IP) address of the first instance;
receiving information about a second instance of the application from a third server, wherein the information about the second instance comprises the identification information of the application and second information, the second information indicates a location of the second instance, and wherein the apparatus is a first server serving the second server and the third server, wherein the second information comprises an IP address of the second instance; and
storing the information about the first instance and the information about the second instance.

21. A apparatus, comprising:
at least one processor; and
one or more memories coupled to the at least one processor and storing one or more instructions for execution by the at least one processor to perform operations comprising:
obtaining information about a first instance of an application, wherein the information about the first instance comprises identification information of the application and first information, and the first information indicates a location of the first instance, wherein the first information comprises an internet protocol (IP) address of the first instance; and
sending the information about the first instance to a first server, wherein the first server is a server serving the apparatus.

* * * * *